US010310099B2

(12) United States Patent
Scoullar et al.

(10) Patent No.: US 10,310,099 B2
(45) Date of Patent: Jun. 4, 2019

(54) METHOD AND APPARATUS FOR RESOLVING INDIVIDUAL SIGNALS IN DETECTOR OUTPUT DATA

(75) Inventors: Paul Andrew Basil Scoullar, Fitzroy North (AU); Robin John Evans, Aspendale (AU)

(73) Assignee: Southern Innovation International Pty Ltd, Carlton North (AU)

(*) Notice: Subject to any disclaimer, the term of this patent is extended or adjusted under 35 U.S.C. 154(b) by 1201 days.

(21) Appl. No.: 13/283,410

(22) Filed: Oct. 27, 2011

(65) Prior Publication Data
US 2012/0041700 A1 Feb. 16, 2012

Related U.S. Application Data

(63) Continuation of application No. 12/130,671, filed on May 30, 2008, now abandoned, which is a continuation of application No. 11/685,719, filed on Mar. 13, 2007, now Pat. No. 7,383,142, which is a
(Continued)

(30) Foreign Application Priority Data

Sep. 16, 2004 (AU) .................. 2004905364

(51) Int. Cl.
G01T 1/17 (2006.01)
G01T 1/202 (2006.01)

(52) U.S. Cl.
CPC .............. G01T 1/171 (2013.01); G01T 1/202 (2013.01)

(58) Field of Classification Search
CPC ........... G01T 1/00; G01T 1/171; G01T 1/202; G01T 1/16
See application file for complete search history.

(56) References Cited

U.S. PATENT DOCUMENTS

| 4,658,216 A | 4/1987 | Goulding et al. |
| 5,210,423 A | 5/1993 | Arseneau |
| 5,225,682 A | 7/1993 | Britton, Jr. et al. |
(Continued)

FOREIGN PATENT DOCUMENTS

| CN | 101666227 | 3/2010 |
| GB | 1413204 | 11/1975 |
(Continued)

OTHER PUBLICATIONS

Marrone, "A new method for signal acquisition and analysis in high radiation environment," Nuclear Instruments and Methods in Physics Research Section B, Jan. 2004, vol. 213, p. 246-249.*
(Continued)

Primary Examiner — Janet L Suglo
Assistant Examiner — Liam R Casey
(74) Attorney, Agent, or Firm — Knobbe, Martens, Olson & Bear, LLP

(57) ABSTRACT

A method and apparatus for resolving individual signals in detector output data by obtaining an impulse response characterizing a detector. The method further includes obtaining digitized detector output data in a form of a digital time series and making estimates of a signal temporal position of at least one signal present in the detector output data. The method further includes forming a mathematical model based on the digital time series and determining an amplitude of the at least one signal indicative of an event based on the mathematical model.

22 Claims, 12 Drawing Sheets

Related U.S. Application Data continuation of application No. PCT/AU2005/001423, filed on Sep. 16, 2005.

(56) References Cited

U.S. PATENT DOCUMENTS

| | | | |
|---|---|---|---|
| 5,349,193 | A | 9/1994 | Mott et al. |
| 5,349,195 | A | 9/1994 | Dumont |
| 5,532,944 | A | 7/1996 | Battista |
| 5,884,234 | A | 3/1999 | Jorion et al. |
| 6,057,551 | A | 5/2000 | Tararine |
| 6,160,259 | A | 12/2000 | Petrillo et al. |
| 6,207,957 | B1 | 3/2001 | Kammeraad et al. |
| 6,215,122 | B1 | 4/2001 | Clifford et al. |
| 6,518,068 | B1* | 2/2003 | Gambini ............... G01N 21/15 250/361 C |
| 6,590,957 | B1 | 7/2003 | Warburton et al. |
| 7,139,350 | B2 | 11/2006 | Tiller et al. |
| 7,439,515 | B2 | 10/2008 | Bak |
| 7,725,281 | B2 | 5/2010 | Jordanov |
| 7,763,859 | B2 | 7/2010 | Mott |
| 7,817,762 | B2 | 10/2010 | Johnstone et al. |
| 7,999,220 | B2 | 8/2011 | Odom |
| 8,227,761 | B2 | 7/2012 | Zhu et al. |
| 2003/0033097 | A1 | 2/2003 | Tanaka et al. |
| 2004/0158440 | A1* | 8/2004 | Warburton ............... G01T 1/17 702/190 |
| 2004/0158592 | A1 | 8/2004 | Nikitin et al. |
| 2004/0195512 | A1 | 10/2004 | Crosetto |
| 2004/0239923 | A1 | 12/2004 | Adams et al. |
| 2010/0074397 | A1 | 3/2010 | Kappler et al. |
| 2010/0270473 | A1 | 10/2010 | Kraft et al. |

FOREIGN PATENT DOCUMENTS

| | | |
|---|---|---|
| JP | 10186041 | 7/1998 |
| JP | 2001337168 | 12/2001 |
| JP | 2002-350545 | 7/2004 |
| JP | 3836629 B2 | 10/2006 |
| JP | 3907910 B2 | 4/2007 |
| JP | 3980451 B2 | 9/2007 |
| JP | 2009229127 | 10/2009 |
| JP | 4358814 B2 | 11/2009 |
| JP | 4706566 B2 | 6/2011 |
| JP | 4787989 B2 | 10/2011 |
| KR | 20110120015 | 11/2011 |
| WO | WO 1994/28438 | 12/1994 |
| WO | WO 1997/07591 | 2/1997 |
| WO | WO 1999/058999 | 11/1999 |
| WO | WO 2000/039600 | 7/2000 |
| WO | WO 2000/073819 A1 | 12/2000 |
| WO | WO 2002/097471 | 12/2002 |
| WO | WO 2003/040757 | 5/2003 |
| WO | WO 2005/121835 | 12/2005 |
| WO | WO 2005/121988 | 12/2005 |
| WO | WO 2007/049168 | 5/2007 |
| WO | WO 2007/146350 | 12/2007 |
| WO | WO 2008/089014 | 7/2008 |
| WO | WO 2008/155679 | 12/2008 |
| WO | WO 2009/020863 | 2/2009 |
| WO | WO 2009/020866 | 2/2009 |
| WO | WO 2009/032452 | 3/2009 |
| WO | WO 2009/050619 | 4/2009 |
| WO | WO 2009/059312 | 5/2009 |
| WO | WO 2009/076256 | 6/2009 |
| WO | WO 2010/014576 | 2/2010 |
| WO | WO 2011/002452 | 1/2011 |
| WO | WO 2011/023431 | 3/2011 |
| WO | WO 2011/039312 | 4/2011 |
| WO | WO 2012/029496 | 3/2012 |
| WO | WO 2012/088781 | 7/2012 |

OTHER PUBLICATIONS

A translation of an Office Action dated Dec. 7, 2010 for corresponding JP Patent Application No. 2007-531539.

Langen et al., "Pileup correction of microdosimetric spectra", Nuclear Instruments and Methods in Physics Research Section A. vol. 484, pp. 595-612 (2002).

Petrick et al., "Least Squares Arrival Time Estimators for Single and Piled Up Scintillation Pulses", Nuclear Science, IEEE Transactions, vol. 40, No. 4, pp. 1026-1030, Aug. 1993.

Lee et al., "Simulation of Maximum-likelihood Position Estimation in Small Gamma Camera with Position-sensitive Photomultiplier Tuve (PSPMT)", Nuclear Science Symposium Conference Record, IEEE, vol. 4, pp. 1915-1918, Nov. 2001.

Kudo et al., "Pile-Up Correction of Pulse Height Spectrum Measured by a Ge Detector to a Pulsed Beam of High Energy Photons", Nuclear Science Symposium, IEEE, vol. 1, pp. 742-754, Nov. 1997.

Tardocchi et al., Cadmium-Zinc-Telluride Photon Detector for Epithermal Neutron Spectroscopy—Purlse Height Response Characterisation, Nuclear Instruments and Methods in Physics Research, vol. 526, pp. 477-492, Jul. 2004.

Wu et al., Characterization and Correction of Pulse Pile-up in Simultaneous Emission-Transmission Computed Tomography, Medical Physics, vol. 23, No. 4, pp. 569-575, Apr. 1996.

Vujo Drndarevic, "Elimination of Distortions of Nuclear Energy Spectra Caused by Pulse Pile-Up", Measurement Science of Technology, vol. 5, No. 12, pp. 1573-1575, Dec. 1994.

Palomba et al., "An Application of the CSSE Code: Analysis of Pulse Pile-Up in NaI(TI) Detectors used for TNA", Nuclear Instruments and Methods in Physics Research, vol. 498, No. 1-3, pp. 397-414, Feb. 2003.

Nikitin et al., "Effect of Pulse Pile-Up on Threshold Crossing Rates in a System With a Known Impulse Response", Nuclear Instruments and Methods in Physics Research, vol. 411, No. 1, pp. 159-171, Jul. 1998.

Drndarevic et al., A Signal Processor for High Counting Rate Gamma Ray Spectroscopy with. NaI(Ti) Detectors, Nuclear Science, IEEE Transactions, vol. 35, Iss. 1, pp. 222-225, Feb. 1988.

Laundy et al., "Modelling Detector Deadtime with the Pulse Overlap Model", AIP Conference Proceedings, No. 708, pp. 977-980, Aug. 2003.

Lamare et al., "Simulation of the Allegro PET System Using GATE", Proceedings of SPIE, Medical Imaging 2004: Physics of Medical Imaging, vol. 5368, pp. 890-897, 2004.

Jordanov et al., "Portable Radiation Spectrometers Using Low Power Digital Pulse Processing", Nuclear Science Symposium Conference Record, IEEE, vol. 1, pp. 375-377, Oct. 1999.

International Search Report and Written Opinion of ISA dated Apr. 1, 2005 and Nov. 7, 2005, respectively, for PCT/AU2005/001423.

Global Patent Solutions Search Report, tracking No. 1305, pp. 1-14, Mar. 1, 2007.

International Preliminary Report on Patentability for PCT Application No. PCT/AU2005/001423 dated Mar. 20, 2007, 4 pages.

Gardner, R.P. and Lee, S.H. "Monte Carlo Simulation of Pulse Pile Up." Center for Engineering Applications of Radioisotopes, Department of Engineering North Carolina State University. JCPDS—International Center for Diffraction Data, 1999.

* cited by examiner

METHOD AND APPARATUS FOR RESOLVING INDIVIDUAL SIGNALS IN DETECTOR OUTPUT DATA

CROSS-REFERENCE TO RELATED APPLICATIONS

This application is a continuation of U.S. patent application Ser. No. 12/130,671, filed May 30, 2008, titled "METHOD AND APPARATUS FOR RESOLVING INDIVIDUAL SIGNALS IN DETECTOR OUTPUT DATA," which is a continuation of U.S. patent application Ser. No. 11/685,719, filed Mar. 13, 2007, titled "METHOD AND APPARATUS FOR RESOLVING INDIVIDUAL SIGNALS IN DETECTOR OUTPUT DATA," which is a continuation of International Application No. PCT/AU2005/001423, filed Sep. 16, 2005, which claims the benefit of Australian Patent Application No. 2004905364, filed Sep. 16, 2004. Each of the foregoing applications is incorporated by reference in its entirety.

BACKGROUND

Field

The present invention relates generally to the field of the detection and measurement of radiation and in particular, though not exclusively, to a method and apparatus for the recovery, from a radiation detector, of data affected by pulse pile-up.

Description of the Related Technology

The accurate detection and measurement of radiation is employed in many industries including homeland security, scientific instrumentation, medical imaging and the minerals processing industry. These and other industries use the detection and measurement of radiation for the non-invasive analysis of materials or other specimens. Transmission based imaging, spectroscopic analysis or other modalities can be used to perform such analysis.

Spectroscopy, for example, is commonly used to analyze materials. Knowledge about the material is obtained by analysis of radiation emission from elements within the specimen. This emission of radiation can be stimulated emission due to some form of incident radiation or the result of natural emission from the constituent elements.

Gamma-ray spectroscopy, for example, is a form of spectroscopy in which the emitted electromagnetic radiation is in the form of gamma-rays. In gamma-ray spectroscopy the detection of the resulting radiation is commonly performed with a scintillation crystal (such as thallium-activated sodium iodide, NaI(Tl)), though there are a number of other detector types that can also be used. NaI(Tl) crystals generate ultra-violet photons pursuant to incident gamma-ray radiation. These photons may then be directed to a photomultiplier tube (PMT) which generates a corresponding electrical signal or pulse. As a result, the interaction between the photons and the detector gives rise to pulse-like signals, the shape of which is determined by the incident gamma-ray radiation, the detecting crystal and the PMT. The fundamental form of these pulse-like signals is referred to as the impulse response of the detector.

The output from the photomultiplier is an electrical signal representing the summation of input signals, of determined form, generated in response to discrete gamma rays arriving at the scintillation crystal. By examining the detector output over time, and in particular the amplitude of the component signals, it is possible to deduce information regarding the chemical composition of the material.

Analysis by gamma-ray spectroscopy requires the characterization of the individual signals generated in response to incident gamma-rays. Signal parameters of particular interest include signal amplitude, number and time of occurrence or temporal position (whether measured as time of arrival, time of maximum or otherwise). If the arrival times of two gamma-rays differ by more than the response time of the detector, analysis of the detector output is relatively straightforward. However, in many applications a high flux of gamma-rays cannot be avoided, or may be desirable so that spectroscopic analysis can be performed in a reasonable time period. As the time between the arrivals of gamma-rays decreases, characterization of all resultant signals becomes difficult.

In particular, the analysis is affected by a phenomenon known as pulse pile-up [G. F. Knoll, Radiation Detection and Measurement, 3rd edition, Chapter 17, pp. 632-634, 658 and 659, John Wiley and Sons, New York 2000], whereby multiple gamma-rays arriving more or less simultaneously produce signals which sum together and may be counted as a single signal. The magnitude of this combined signal is greater than the individual components, leading to errors in later analysis.

The energy of an incident gamma-ray may be reflected in the amplitude of the pulse-like signal produced by the detector. The presence of specific gamma-ray energies within the detector signal is indicative of particular elements in the material from which gamma-rays originate. Thus, a failure to differentiate a large amplitude signal caused by a single scintillation event from the superposition of multiple events can have a serious effect on the accuracy of subsequent spectroscopic analysis.

Some existing techniques aim to prevent corruption of the spectroscopic analysis due to pulse pile-up. Certain pulse shaping electronics have been shown to reduce the response time of the detector resulting in a diminished prevalence of pile-up in the final spectrum [A. Pullia, A. Geraci and G. Ripamonti, Quasioptimum γ and X-Ray Spectroscopy Based on Real-Time Digital Techniques, Nucl. Inst. and Meth. A 439 (2000) 378-384]. This technique is limited, however, by detector response time. Another approach is 'pulse pile-up rejection' whereby signals suspected to contain pulse pipe-up are discarded. Only signals free from pulse pile-up are used in spectroscopic analysis. However, as the rate of radiation incident on the detector increases, so too does the likelihood that pulse pile-up will occur and the more it is necessary to discard data. Accordingly, existing pulse pile-up rejection is of limited usefulness since a state is quickly reached beyond which a higher incident radiation flux ceases to reduce the time needed for analysis, as an increasing percentage of data must be rejected.

A more sophisticated approach is to make use of prior knowledge about the profile of a single pulse from the detector or to model mathematically the parameters of a signal. It is then possible in principle to distinguish signals or pulses that originate from a single event from those caused by pulse pile-up. In one such method of analysis [R. J. Komar and H.-B. Mak, Digital signal processing for BGO detectors, Nucl. Inst. and Meth. A 336 (1993) 246-252], signals that depart from the simple profile are selected for subsequent analysis. This analysis involves fitting, via an iterative process, two pulses of varying separation and amplitude. Once the fit has been determined, the characteristics of the individual pulses are known from the fitting parameters and hence a pulse arising from two closely occurring signals can be decomposed into the corresponding discrete signals. However, this approach fails to accommodate circumstances where pulse pile-up is caused by the superposition of more than two signals. The iterative optimization is computationally expensive and the time taken to carry out this procedure renders it impractical in most situations.

SUMMARY

According to a first aspect of the invention, therefore, there is provided a method for resolving individual signals in detector output data, comprising determining a signal form of signals present in the data (or the impulse response), making parameter estimates of one or more parameters of the signals, wherein the one or more parameters comprise at least signal temporal position, and determining the energy of the signals from at least the signal form and the parameter estimates.

Thus, this method endeavours to characterize as much data as possible, but it will be appreciated that it may not be possible to adequately characterize some data (which hence is termed 'corrupt data'), as is described below. It will be understood that the term 'signal' is interchangeable in this context with 'pulse', as it refers to the output corresponding to individual detection events rather than the overall output signal comprising the sum of individual signals. It will also be appreciated that the temporal position (or timing) of a signal can be measured or expressed in various ways, such as according to the time (or position in the time axis) of the maximum of the signal or the leading edge of the signal. Typically this is described as the arrival time ('time of arrival') or detection time.

It will also be understood that the term 'detector data' refers to data that has originated from a detector, whether processed subsequently by associated or other electronics within or outside the detector.

The method may include constructing a model of the data from the parameter estimates, and determining the accuracy of the parameter estimates based on a comparison between the detector output data and the model.

The signal form (or impulse response) may be determined by a calibration process that involves measuring the detector's time domain response to one or more single event detections to derive from that data the signal form or impulse response. A functional form of this signal form may then be obtained by interpolating the data with (or fitting to the data) a suitable function such as a polynomial, exponential or spline. A filter (such as an inverse filter) may then be constructed from this detector signal form. An initial estimate of signal parameters may be made by convolution of the output data from the detector with the filter. Signal parameters of particular interest include the number of signals and the temporal position (or time of arrival) of each of the signals.

The particular signal parameters of interest can then be further refined. Firstly, the estimate of the number and arrival times of signals is refined with the application of peak detection and a threshold. Secondly, knowledge of the number of signals and their arrival time, coupled with the detector impulse response (and hence signal form) makes it possible to solve for the energy parameters of the signals.

The accuracy of the parameter estimation can be determined or 'validated' by comparing a model (in effect, an estimate) of the detector data stream (constructed from the signal parameters and knowledge of the detector impulse response) and the actual detector output. Should this validation process determine that some parameters are insufficiently accurate, these parameters are discarded. In spectroscopic analysis using this method, the energy parameters deemed sufficiently accurate may be represented as a histogram.

The method may include making the estimates of signal parameters in accordance with the signal form (i.e. the impulse response of the detector used for generating the signal). The method may include determining the signal form by a calibration process including measuring the response of the detector to one or more single detections to derive a data based model of the signal form. In particular, the method may include obtaining a functional form of the model by interpolating the data with a function to generate the expected signal form. The function may be a polynomial, exponential or spline function.

The method may include designing a filter on the basis of the predetermined form of the individual signals produced by the radiation detector. The filter may be, for example, of matched filter or inverse filter form.

In one embodiment, the method includes using convolution of the detector output and filter to make an initial estimate of the signal parameters. The method may include refining the estimate of the signal parameters. The method may include refining the estimate of signal number with a peak detection process. The method may include making or refining the estimate of signal temporal position by application of a peak detection process. The method may include refining the estimate of signal energy by solving a system of linear equations, by matrix inversion or by iterative techniques.

In an embodiment of the invention, the method includes creating a model of the detector output using the signal parameters in combination with the detector impulse response. The method may include performing error detection by, for example, comparing the actual detector output data with the model of the detector output, such as by using least-squares or some other measure of the difference between the data and the model.

The method may include discarding parameters deemed not sufficiently accurately estimated.

In one embodiment, the method includes presenting all sufficiently accurate energy parameters in a histogram.

The data may include signals of different forms. In this case, the method may include determining where possible the signal form of each of the signals.

For example, in some detectors the signal form depends on the depth within the detector at which the radiation/detector interaction occurs. In other detectors, the signal form may depend on how much time has elapsed since the previous radiation/detector interaction occurred in the same region of the detector.

In one embodiment, the method includes progressively subtracting from the data those signals that acceptably conform to successive signal forms of a plurality of signal forms, and rejecting those signals that do not acceptably conform to any of the plurality of signal forms.

In another aspect, the invention provides an apparatus for pulse pile-up recovery from data comprising a plurality of signals output from a radiation detector. The term 'recovery' is used because data that would otherwise be unusable owing to pile-up is 'recovered' and rendered useable. The apparatus of this aspect comprises a processor for receiving the data in digitized form, and is programmed to determine the signal form of each of said signals present in the data, to make parameter estimates of one or more parameters of the signals, and to determine the energy of the signals from at least the signal form and the parameter estimates, wherein the one or more parameters comprise at least signal temporal position.

The apparatus may include an analog to digital converter adapted to receive the data, to convert the data into digitized form, and forward the data in digitized form to the processor. This would be of particular use where the detector outputs analog data.

The processor may comprise a field programmable gate array (or an array thereof). Alternatively, the processor may comprise a digital signal processor (or an array thereof). In a further alternative, the processor comprises a field programmable gate array (or an array thereof) and a digital signal processor (or an array thereof). The apparatus may include an analog front end that includes the analog to digital converter.

The apparatus may include an electronic computing device in data communication with the processor, for controlling the processor and for displaying an output of the processor. The apparatus may include the radiation detector.

The apparatus may be, for example, a metal detector, a landmine detector, a medical imaging apparatus, a mineral detection apparatus, an oil well logging apparatus, an unexploded ordnance detector, a cargo screening apparatus, an X-ray fluorescence apparatus or an X-ray diffraction apparatus.

According to still another aspect of the invention, there is provided a method for resolving individual signals in detector output data, comprising determining the form of signals present in the data, and making parameter estimates of one or more parameters of the signals from at least the form, wherein the one or more parameters comprise at least signal temporal position.

According to another aspect of the invention, there is provided a method for pulse pile-up recovery from detector output data, comprising determining the form of signals present in the data, making parameter estimates of one or more parameters of the signals, wherein the one or more parameters comprise at least signal temporal position, and determining the energy of the signals from at least the form and the parameter estimates.

BRIEF DESCRIPTION OF THE DRAWINGS

In order that the invention may be more clearly ascertained, preferred embodiments will now be described, by way of example only, with reference to the accompanying drawing, in which.

DETAILED DESCRIPTION OF EMBODIMENTS

Figure 1:
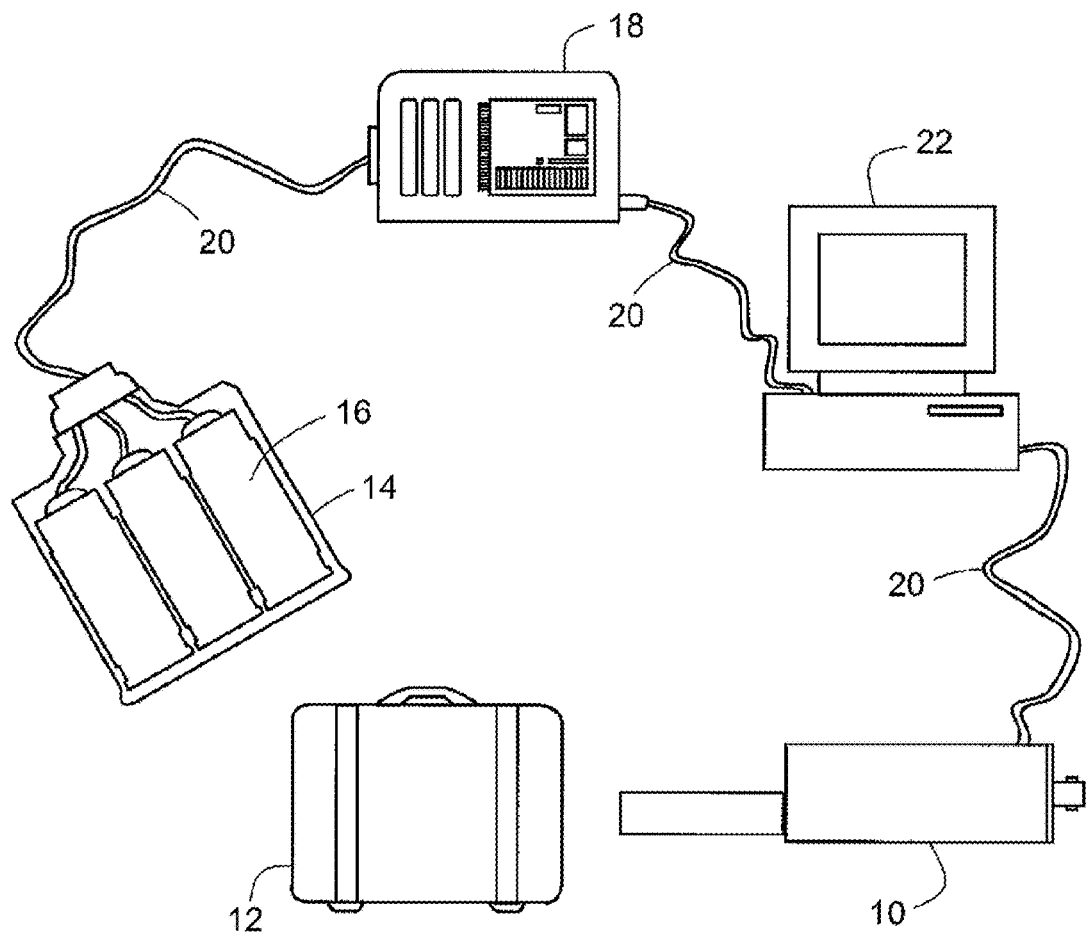
FIG. 1 is a view of a gamma-ray spectroscopy apparatus according to an embodiment of the present invention.

FIG. 1 is a schematic view of a gamma-ray spectroscopy apparatus adapted to perform pulse pile-up recovery according to an embodiment of the present invention, with an item to be analyzed. The apparatus of FIG. 1 includes a neutron generator (10) for generating neutrons for interacting with an item under analysis or specimen (12), and a detector unit (14), in the form of a scintillation based gamma-ray radiation detector, for detecting gamma-ray radiation resulting from the interaction of neutrons and the specimen (12). The detector unit includes sensors or detector elements (16) that each has a scintillation crystal (in this example, sodium iodide) coupled to a photomultiplier tube (not shown). It will be appreciated that the apparatus could readily be modified, particularly by substituting a different form of detector unit, to detect other forms of radiation.

The apparatus also includes a signal processing unit (18) that comprises two parts: 1) an analog to digital converter which produces a digital output corresponding to the analog output of the detector unit, and 2) a processing unit which implements digital signal processing (DSP) routines in accordance with the invention. The electrical output signals of the photomultiplier tubes are connected to the signal processing unit. The apparatus also includes cables (20) and a computer (22) for display, the former for coupling the output from the signal processing unit to the computer (22).

Figure 2:
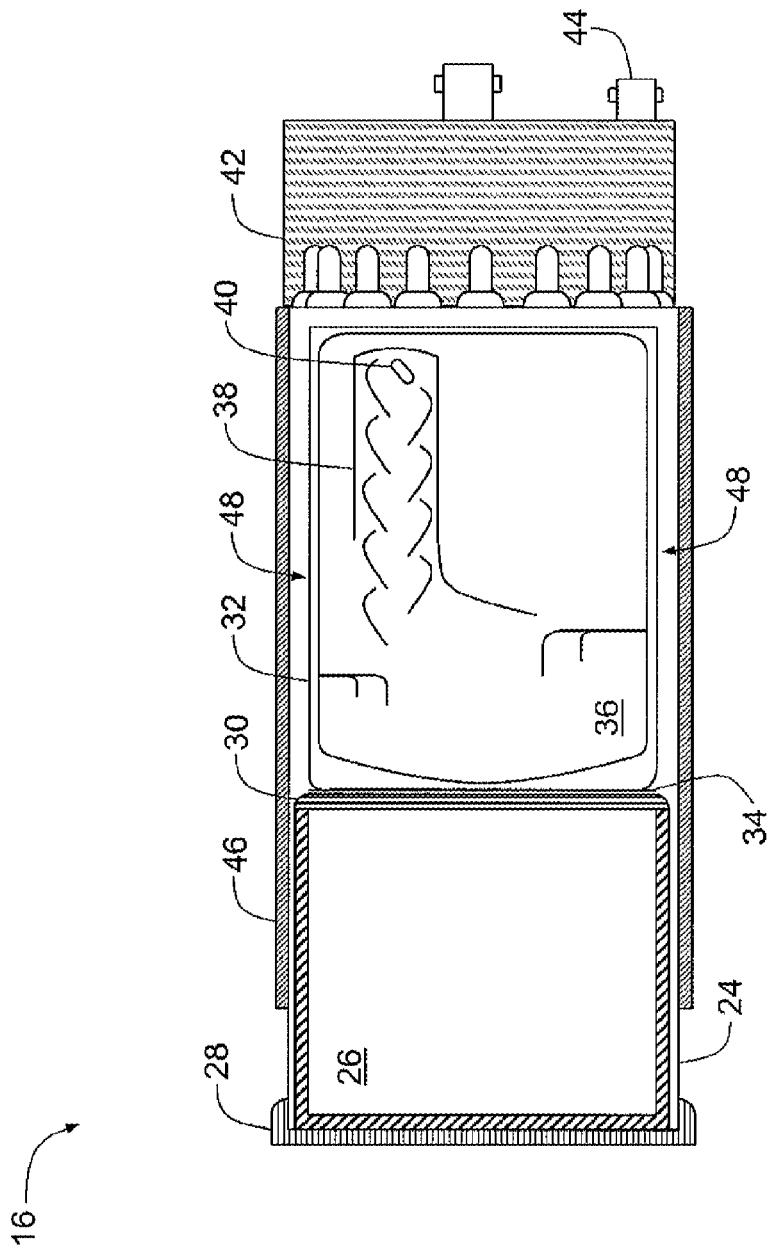
FIG. 2 is a view of a Sodium Iodide NaI(Tl) gamma-ray detector of the apparatus of FIG. 1.

FIG. 2 is a view of one of the detector elements (16). The illustrated detector element is in the form of a NaI(Tl) scintillation based gamma-ray detector, and comprises a cylindrical housing in the form of aluminium body (24) with a NaI(Tl) crystal (26) located therein at one (forward) end positioned between an aluminium outer end cap (28) (forward of the NaI(Tl) crystal (26)) and an inner optical window (30) (rearward of the NaI(Tl) crystal (26)). The detector includes a photomultiplier tube (32) rearward of the optical window (30). Optical coupling fluid (34) may be used between the NaI(Tl) crystal (26) and the optical window (30), and between the optical window (30) and the photomultiplier tube (32).

When a gamma-ray interacts with the detector by passing into the detector through the end cap (28), energy is transferred from the gamma-ray to electrons within the NaI(Tl) crystal (26). Upon the emission of ultra-violet photons the electrons lose said energy) promoting electrons within the crystal to excited states. Upon the emission of ultra-violet photons the electrons decay to lower energy states. The aforementioned ultra-violet photons pass through the optical window to the photocathode (36) of the photomultiplier tube (32) where they are converted into photoelectrons and subsequently multiplied by an electron multiplier (38) before arriving at the anode (40) of the photomultiplier tube (32). A further multiplication stage can be provided by a preamplifier (42). In this manner an electrical signal, whose amplitude is proportional to the energy of the incident gamma-rays, is present at the detector output terminals (44) of the detector. It will also be appreciated that the detector may additionally include a mu metal magnetic shield (46) located about the sides (48) of the photomultiplier tube (32) and extending forwardly of the photomultiplier tube (32) sufficiently far to surround a portion of the NaI(Tl) crystal (26).

Scintillation detectors of the kind last described have high efficiencies, that is, exhibit a high probability of detecting an incident gamma-ray. However, they also exhibit a relatively long detector response time. The detector response time is the time required by the detector to detect an incident gamma-ray and return to a state where the next incident gamma-ray can be accurately detected. Radiation detectors with long detector response times are thus prone to pulse pile-up. That is, the output, which ideally consists of completely discrete pulses each corresponding to the incidence of a single gamma-ray, instead exhibits a waveform in which individual pulses can overlap making them difficult to characterize.

Figure 3A:
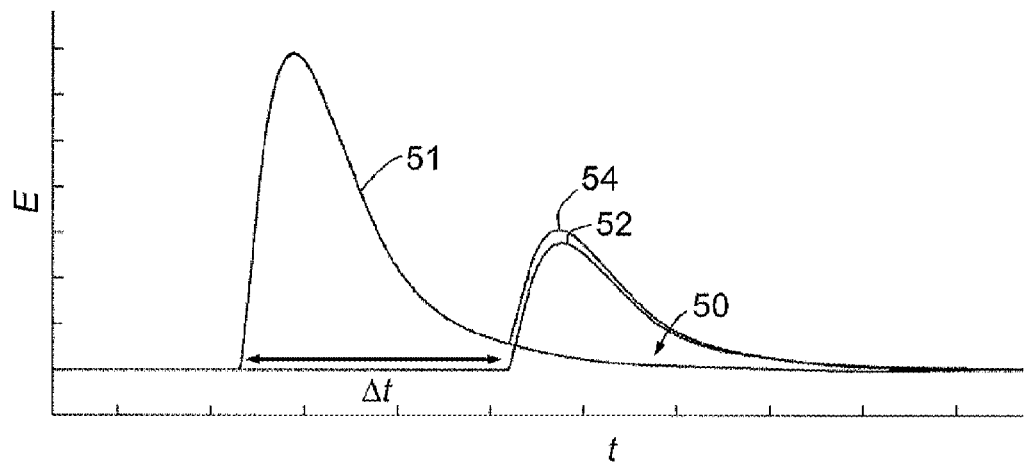
FIGS. 3a, 3b and 3c are graphs illustrating pulse pile-up.
Figure 3B:
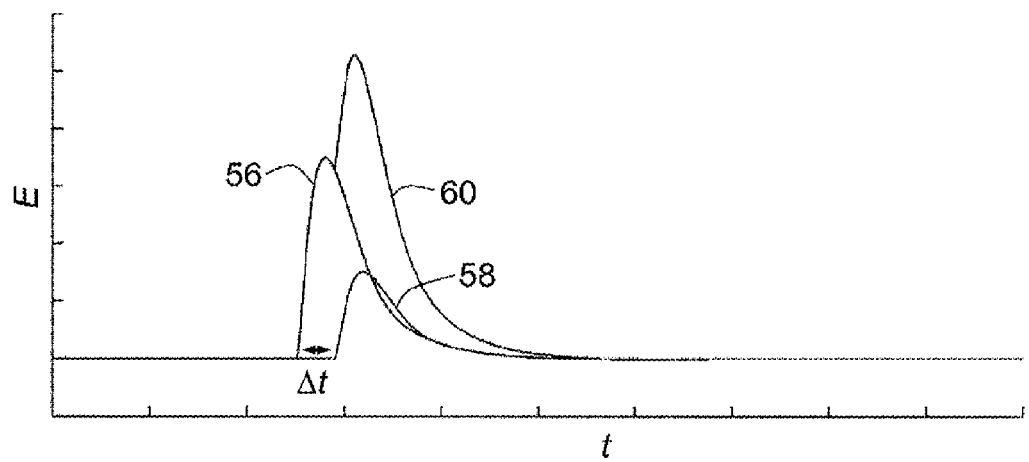
Figure 3C:
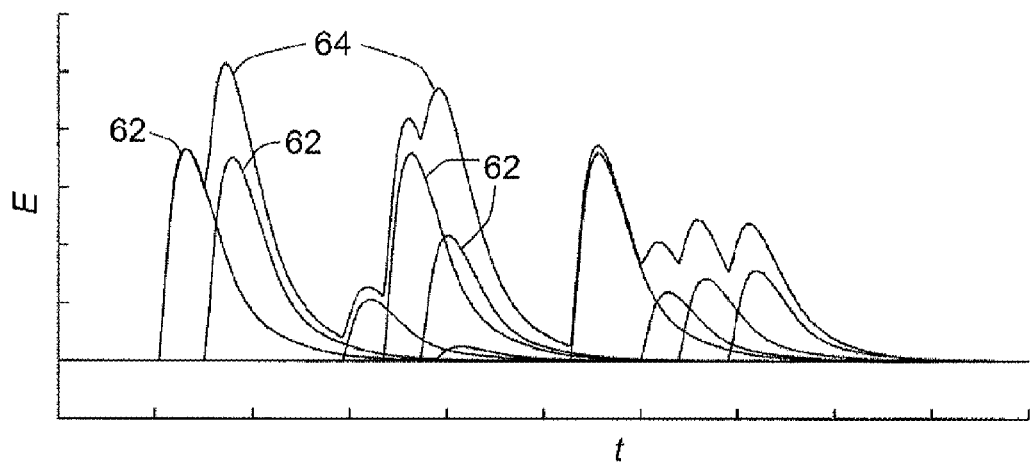

FIGS. 3a, 3b and 3c illustrate the effect of pulse pile-up, and show illustrative signals or pulses plotted as energy E versus time t (both in arbitrary units). FIG. 3a illustrates so-called 'tail-end pile-up' where, depending on the type of pulse conditioning employed, the tail (50) of one pulse (51) can provide a significant positive or negative bias (positive in the illustrated example) to the amplitude of a subsequent pulse (52). Although the time displacement between the two pulses, Δt, is relatively large (when compared with the overall time interval for which the pulses prevail), the signal envelope or resultant waveform (54) is significantly above zero at the arrival of the second pulse (52).

The absence of a true zero signal state between the two pulses corrupts the pulse characterization, as the amplitude of the second pulse is falsely inflated by the tail of the first. FIG. 3b illustrates another form of pulse pile-up, 'peak pile-up'. Here two pulses (56) and (58) arrive closely spaced in time (i.e. the time displacement Δt between the pulses is small compared with the overall time interval over which the pulses prevail). The resultant output waveform (60) appears more or less as a single pulse of somewhat greater amplitude than either of the component pulses. In situations where the flux of gamma-rays through the detector is extreme, it is not uncommon to have multiple events arriving within the response time of the detector leading to multiple pile-up events. Such a case is illustrated by FIG. 3c. Multiple signals or pulses (such as those shown at 62) arrive with random time separation Δt and sum to produce a resultant waveform (64) from which the parameters of the component signals are difficult to extract.

One component of the method of addressing pulse pile-up according to this embodiment is the estimation of certain parameters of the signals or pulses; these parameters are the number, time-of-arrival and energy of all gamma-rays in the detector data stream. These parameters are estimated, according to this embodiment, by modeling the signals in the data stream mathematically. The model employed in this embodiment includes certain assumptions about the data and the apparatus, as are discussed below.

Figure 4:
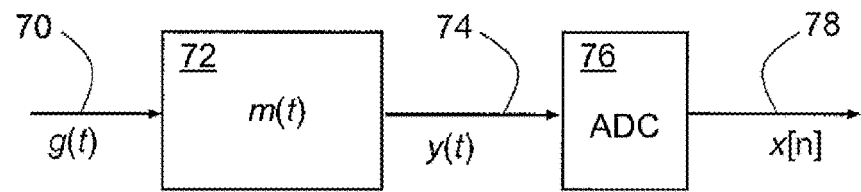
FIG. 4 is a diagram illustrating the mathematical modeling of radiation detection used by the signal processing method embodied in the apparatus of FIG. 1.

FIG. 4 is a diagram that illustrates the modeling of the radiation detection process. The radiation g(t) (70) is incident on the detector (72) represented by the measurement process m(t), resulting in output data from the detector y(t) (74). The addition of a sampling process (76) produces the digital detector data or 'time-series' x[n] (78).

Figure 5:
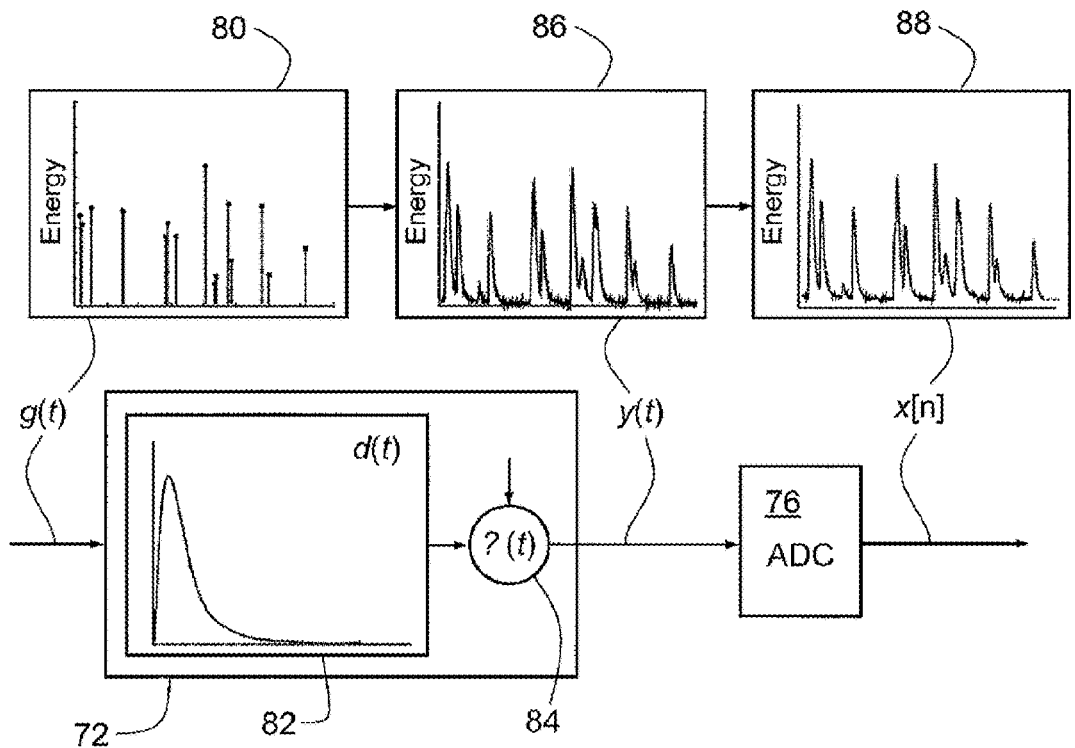
FIG. 5 is a diagram detailing the mathematical model of radiation detection used by the signal processing method embodied in the apparatus of FIG. 1.

It is possible to add to the above-described model some knowledge about the physical processes of radiation detection. FIG. 5 illustrates a more detailed mathematical model of the detection process shown in FIG. 4. The input g(t) to the detector is characterized by Equation 1, in which the input g(t) is assumed to be an unknown number (N) of delta-function-like impulses of random amplitude (α) and time of arrival (τ). An illustrative example of such input is shown at (80).

$$g(t) = \sum_{i=1}^{N} \alpha_i \delta(t - \tau_i) \qquad (1)$$

$$i = 1, 2, 3, \ldots, N.$$

The radiation detector is assumed to have a specific response to the incoming radiation, referred to as the detector impulse response d(t) (or, equivalently, the signal form of the signals in the data), which is illustrated at (82). The digitized version of the detector impulse response (i.e. signal form) is denoted d[n].

The output from the detector is shown at (86) and characterized by Equation 2, in which the detector output y(t) is the sum of an unknown number of signals of predetermined signal form d(t), with unknown energy (α) and unknown time of arrival (τ). Sources of random noise ω(t) (84) are also considered. The digital detector data x[n] (88) is produced by the analog to digital converter (76).

$$y(t) = \sum_{i=1}^{N} \alpha_i d(t - \tau_i) + \omega(t) \qquad (2)$$

$$i = 1, 2, 3, \ldots, N.$$

The digitized signal x[n] (which constitutes a time series of data) at the output of the analog to digital converter (76), as illustrated at (88), is therefore given by $$x[n] = \sum_{i=1}^{N} \alpha_i d[n - \Delta_i] + \omega[n], \qquad (3)$$

where d[n] is the discrete time form of the signal form d(t), $\Delta_i$ is the delay in samples to the ith signal, and ω[n] is the discrete time form of the noise. The digitized signal x[n] may also be written in matrix form as $$x = A\alpha + \omega, \qquad (4)$$

where A is an M×N matrix, the entries of which are given by $$A(n, i) = \begin{cases} d[n - \Delta_i] & \Delta_i \leq n < \min(M, \Delta_i + T - 1) \\ 0 & \text{otherwise.} \end{cases} \quad (5)$$

Also, T is the length of d[n] in samples, M is the total number of samples in the digitized signal x[n], α is the vector of N signal energies, and ω is the noise vector of length M. Matrix A may also be depicted as follows:

$$A = \begin{bmatrix} 0 & 0 & \cdots & 0 \\ \vdots & & & \\ 0 & \vdots & & \\ d[1] & & & \vdots \\ d[2] & 0 & & \\ \vdots & d[1] & & \\ d[T] & & & \\ 0 & \vdots & \ddots & 0 \\ & & & d[1] \\ \vdots & d[T] & & d[2] \\ & & & \vdots \\ 0 & \cdots & 0 & d[r < T] \end{bmatrix} \begin{matrix} \\ \\ \\ \leftarrow \text{row } \Delta_1 \\ \\ \leftarrow \text{row } \Delta_2 \\ \\ \\ \leftarrow \text{row } \Delta_N \\ \\ \\ \end{matrix}$$

Thus, the columns of matrix A contain multiple versions of the signal form. For each of the individual columns the starting point of the signal form is defined by the signal temporal position. For example, if the signals in the data arrive at positions 2, 40, 78 and 125, column 1 of matrix A will have '0' in the first row, the 1st datum point of the signal form in the second row, the 2nd datum point of the signal form in the 3rd row, etc. The second column will have '0' up to row 39 followed by the signal form. The third column will have '0' up to row 77; the fourth column will have '0' up to row 124 and then the signal form. Hence the size of matrix A is determined by the number of identified signals (which becomes the number of columns), while the number of rows depends on the number of samples in the time series.

The signal processing method of this embodiment thus endeavors to provide an accurate estimate of some unknown parameters of the detector data, including not only the number of component signals (N) in the detector output but also the energy (α) and time-of-arrival (τ) of each of the component signals.

Signal Processing Method

Figure 6:
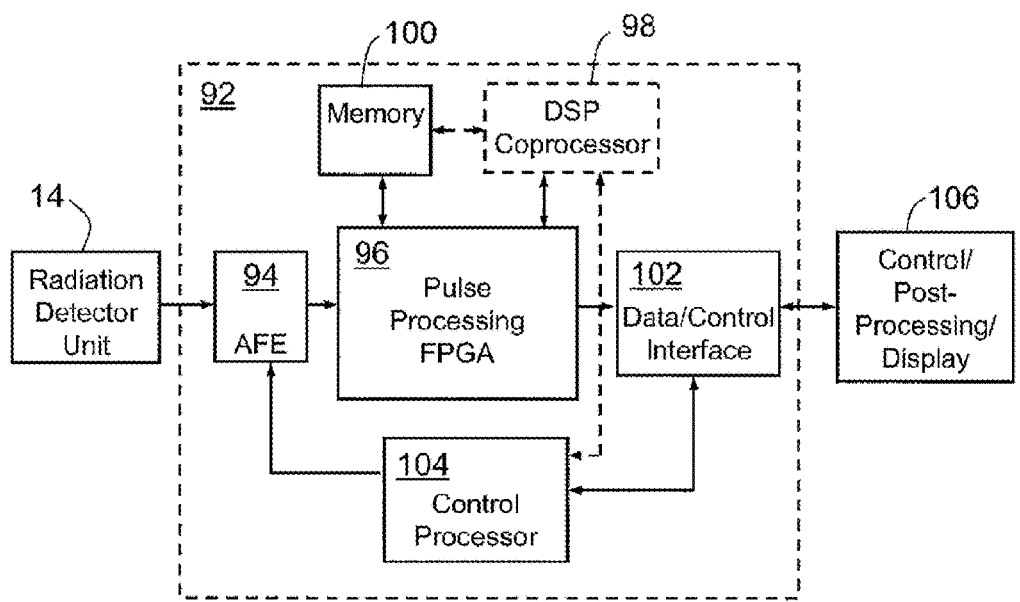
FIG. 6 is a schematic diagram of the apparatus of FIG. 1.

FIG. 6 is a schematic diagram of the functional elements of the gamma-ray spectroscopy apparatus of FIG. 1, and is provided to explain in more detail the signal processing method for pulse pile-up recovery employed by the apparatus of FIG. 1. Referring to FIG. 6, the radiation detector unit (14) is connected to a pulse processing board (92) via an analog front end (AFE 94). The purpose of the AFE (94) is to digitize the signal produced by the radiation detector unit (14) by performing analog to digital conversion at, in this embodiment, 125 MHz with 12-bit conversion accuracy.

Figure 7A:
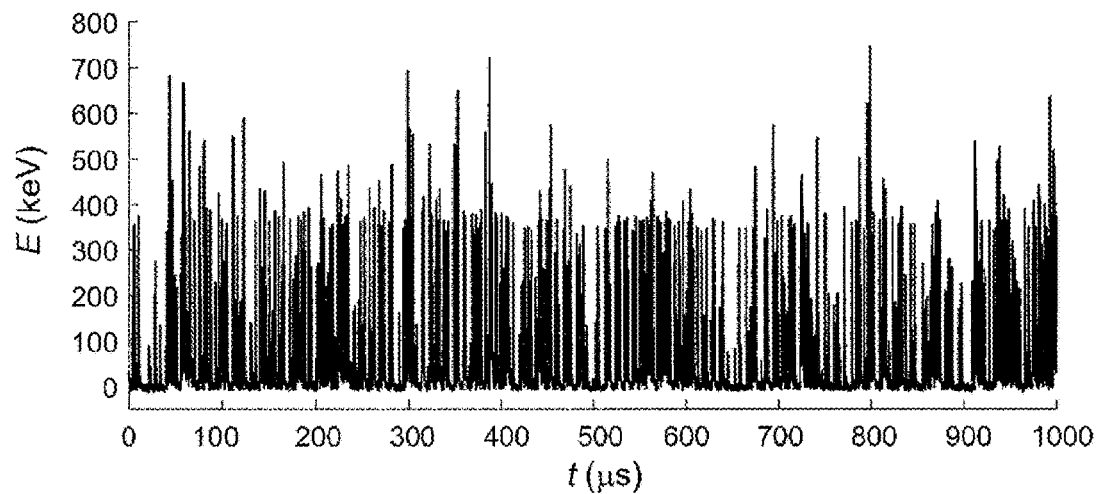
FIGS. 7a, 7b and 7c are plots of unprocessed digitized data collected directly from the output of the detector of FIG. 2 over time ranges of 1000 microseconds, 100 microseconds and 10 microseconds respectively.
Figure 7B:
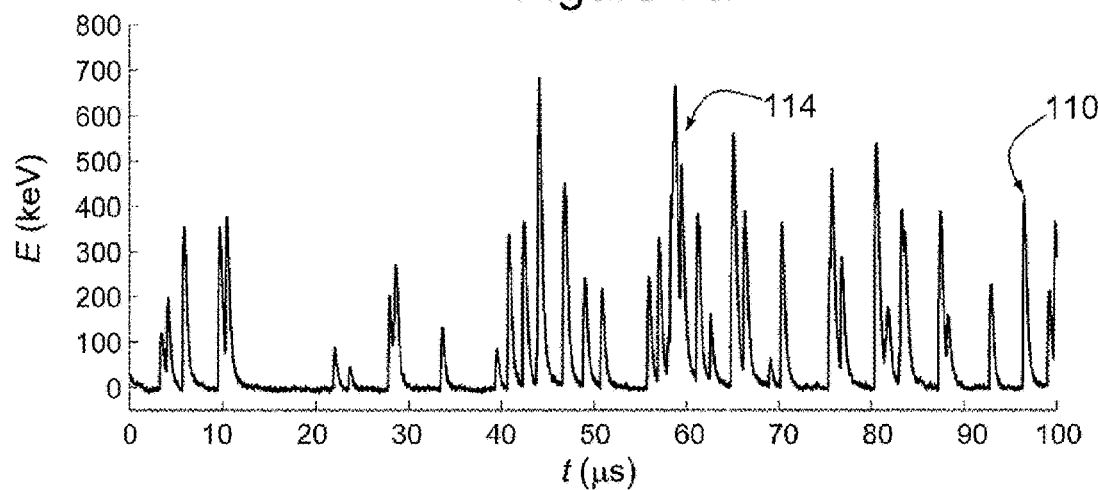
Figure 7C:
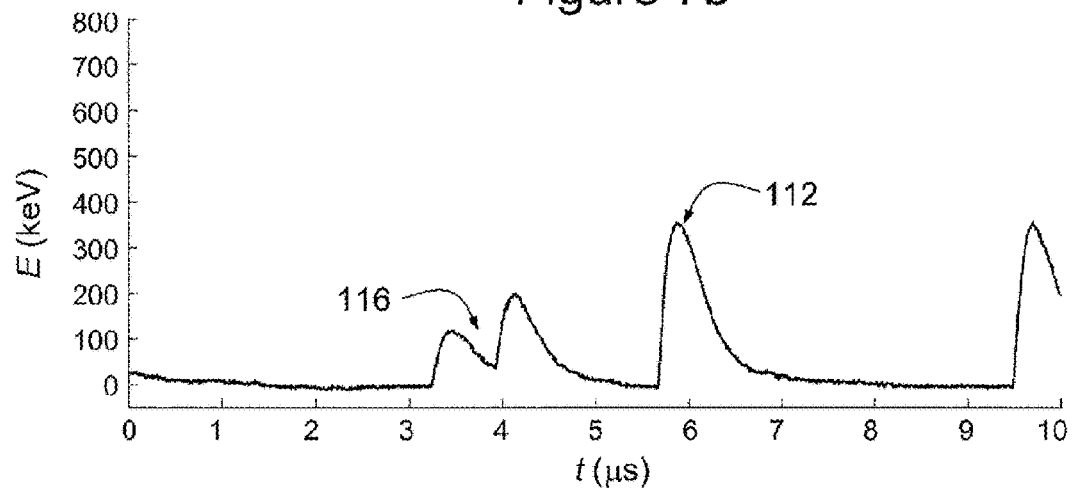

FIGS. 7a, 7b and 7c illustrate the waveform resulting from such digitization, over time ranges of 1000 microseconds, 100 microseconds and 10 microseconds respectively. The various peaks in these figures correspond to the detection of respective gamma-rays. Some peaks appear as discreet signals or pulses (110, 112) which may indicate the presence of only a single gamma-ray. Other peaks are due to the pile-up either of two peaks (116) or of three or more peaks (114).

After the output of the radiation detector unit (14) has been digitized by the AFE (94), the signal processing method for pulse pile-up recovery is implemented. Referring again to FIG. 6, the digital signal produced by the AFE (94) is passed into the pulse processing Field Programmable Gate Array (FPGA) (96). The pulse processing FPGA (96) then implements the pulse processing method of this embodiment; a digital signal processing coprocessor (98) may optionally be used to assist the pulse processing FPGA (96) to implement the pulse processing method. Variables required by the pulse processing FPGA (96) and data produced at interim steps of the pulse processing method are optionally stored in memory (100). The signal processing is controlled via a Data/Control Interface (102) which, in conjunction with a Control Processor (104), can be used to modify the implementation of the signal processing. The output data from the signal processing method can be displayed on a display (106) via the Data/Control Interface (102). Display (106) is provided in a computer that may, if desired, be used to perform post-processing and system control.

Figure 8:
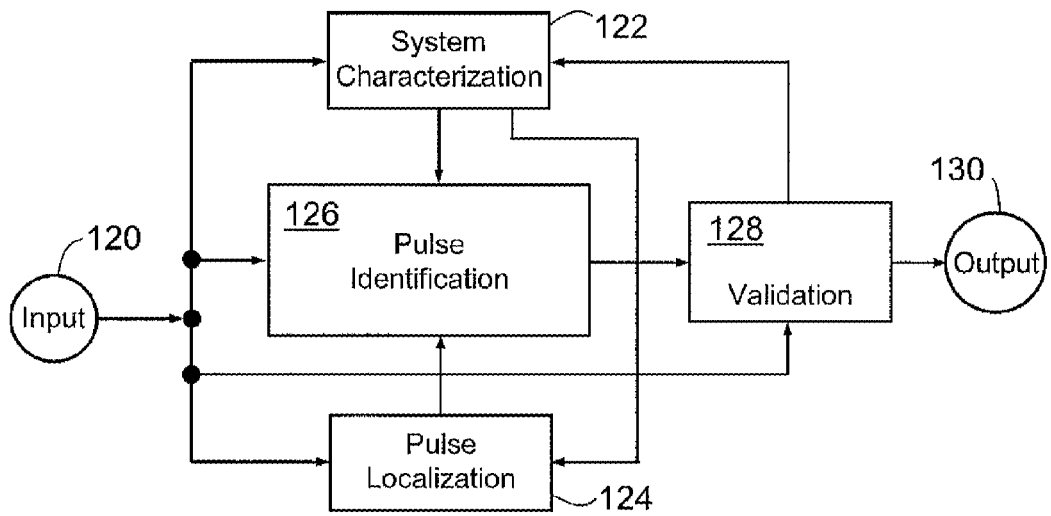
FIG. 8 is a schematic representation of the signal processing method for pulse pile-up recovery employed by the apparatus of FIG. 1 for analyzing spectroscopic data according to this embodiment of the invention.

FIG. 8 is a schematic diagram of the signal processing method for pulse pile-up recovery of radiation signals in the detector time series of this embodiment. The digitized detector signal (from AFE (94)) forms the input (120) for this signal processing method. Offline System Characterization (122) is used to determine the detector impulse response unique to the particular digitized detector signal. Characterization data generated in System Characterization phase (122) is use in a Pulse Localization phase (124). The Pulse Localization phase (124) estimates, in real-time, the number and temporal position (or time-of-arrival) of radiation pulses within the digitized detector signal. In a Pulse Identification phase (126), the digitized detector signal, the detector impulse response and the output from the Pulse Localization phase (124) are used to determine the energy of the signals or pulses. Validation (128) involves comparing the output of the Pulse Identification phase (126) with the digitized detector signal (120). If this comparison indicates that any of the pulse parameters have been estimated inaccurately, those parameters are rejected so that only valid data is output (130). The error signal generated in the Validation phase (128) is also employed in System Characterization (122). In circumstances where the detector impulse response may change over time, such as owing to the aging of components, temperature variations or increased radiation fluxes, System Characterization (122) updates the detector impulse response online and adaptively by employing the error signal. Such updating of the detector impulse response may be performed with any suitable adaptive method, such as least mean squares adaptation, normalized least mean squares adaptation or recursive least squares adaptation as described, for example, by S. Haykin [Adaptive Filter Theory, 4th Ed, Prentice Hall, 2002].

Figure 9:
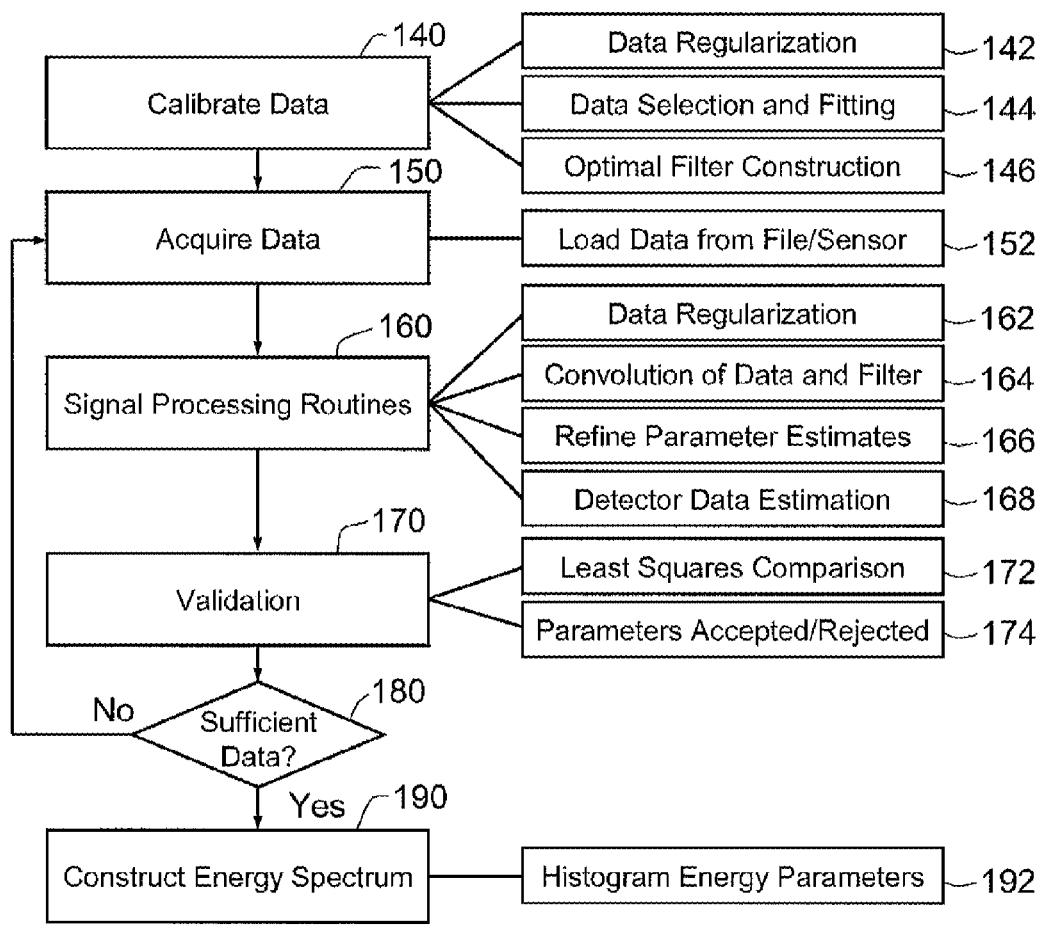
FIG. 9 is a schematic flowchart of the signal processing method for pulse pile-up recovery employed by the apparatus of FIG. 1 for analyzing spectroscopic data according to this embodiment of the invention.

FIG. 9 is a flow diagram of the signal processing method of this embodiment. At step (140), calibration is performed. This involves Data Regularization or Conditioning (142), Data Selection and Fitting (144) and Optimal Filter Construction (146). In Data Regularization (142), calibration data (signals recorded at a low incident radiation flux) are loaded from data files, the integrity of these calibration data is checked and any bias in the baseline of the data removed. Data Selection and Fitting (144) involves selecting only that data corresponding to the detection of single radiation events and constructing a data based model of the detector impulse response. A functional form of this model is then obtained by fitting a suitable function to the data, such as a polynomial, exponential or spline function. This results in the expected impulse response of the detector d[n]. Optimal Filter Construction (146) employs this detector impulse response to construct a suitable filter for the detector, such as an inverse filter or a matched filter.

At step (150) data is acquired, but may be affected by significant pulse pile-up. The data may be input (152) either from a file or directly from the detector elements (16).

At step (160) signal processing routines are applied to determine the amplitude and timing parameters of the signals in the time series. Firstly the data is conditioned (162) to remove any bias in the baseline of the data. Next, the detector data is convoluted (164) with the filter derived in step (146) to provide an initial estimate of the time-of-arrival parameters ($\tau$) and number of pulses (N). The timing parameters and estimate of the number of pulses are then further refined (166) using a suitable peak detection process, and the energy parameter ($\alpha$) is determined from $\tau$, N and the detector impulse response d[n] (such as by linear programming, matrix inversion or convolution techniques). Finally, from the number (N), energy ($\alpha$), timing ($\Delta i$) and detector impulse response (d[n]), an estimate of the detector data stream ($\hat{x}[n]$) is made (168).

The parameter vector ($\alpha$) may be determined by linear programming or by solving the system of linear equations defined in Equation 4 using a suitable method for solving such systems of equations, such as one of those described, for example, by G. H. Golub and C. F. Van Loan [Matrix Computations, 2nd Ed, Johns Hopkins University Press, 1989].

At step (170) the validation phase (128) referred to above is performed, which may be referred to as error checking as, in this embodiment, validation involves determining an error signal e[n], computed successively for the set of samples corresponding to each signal i where 1<i<N (N being the total number of signals in the data stream). This error signal is calculated by determining (172) the squares of the differences between the time series data x[n] and the model based data-stream ($\hat{x}[n]$ from step (168)); e[n] is thus the square of the difference between x[n] and $\hat{x}[n]$, as given in Equation 6.

$$e[n]=(x[n]-\hat{x}[n])^2 \quad (6)$$

If e[n] exceeds a predetermined threshold, these parameters are rejected (174) as this condition indicates that the signal parameters do not produce a model of the respective signal that acceptably conforms to that signal (that is, is sufficiently accurate); the relevant signal is deemed to constitute corrupted data and excluded from further spectroscopic analysis. The threshold may be varied according to the data and how closely it is desired that the data be modeled; generally, therefore, in any particular specific application, the method of validation and definition of the threshold are chosen to reflect the requirements of that application.

One example of such a threshold is the signal energy $\alpha i$ multiplied by a suitable factor, such as 0.05. Validation will, in this example, deem that the model acceptably conforms to the data constituting signal i when:

$$e[n]>0.05\alpha_i \quad (7)$$

Validation may be performed by defining the error signal and threshold in any other suitable way. For example, the error signal may be set to the absolute value of the error. The threshold may be defined to be a multiple other than 0.05 of the signal amplitude. Another threshold comprises a number of noise standard deviations.

Decreasing the threshold (such as by decreasing the coefficient of $\alpha i$ in Equation 7) enables improved energy resolution at lower throughput, while increasing the threshold enables improved throughput at reduced energy resolution.

At step (180) a decision is made as to whether there is sufficient data. If not, processing continues at step (150). Otherwise, the method proceeds to step (190). At step (190) a gamma-ray energy spectrum is created. The gamma-ray energy parameters determined at step (166), which were deemed to be of sufficient accuracy at step (174), are represented (192) in the form of a histogram. This is the gamma-ray energy spectrum on which spectroscopic analysis may be performed.

Results of Signal Processing Method

Figure 10A:
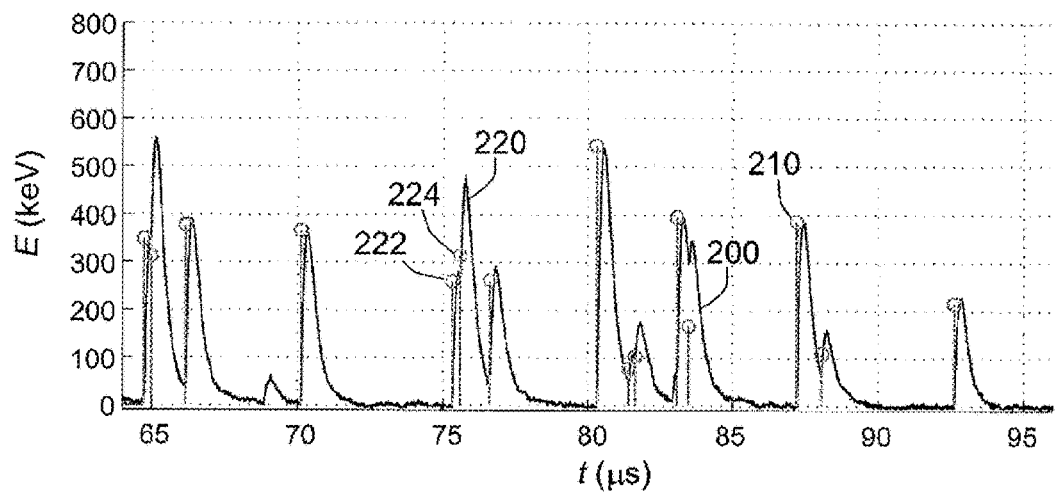
FIGS. 10a, 10b and 10c are plots of the results at different stages of the signal processing method of FIG. 9.
Figure 10B:
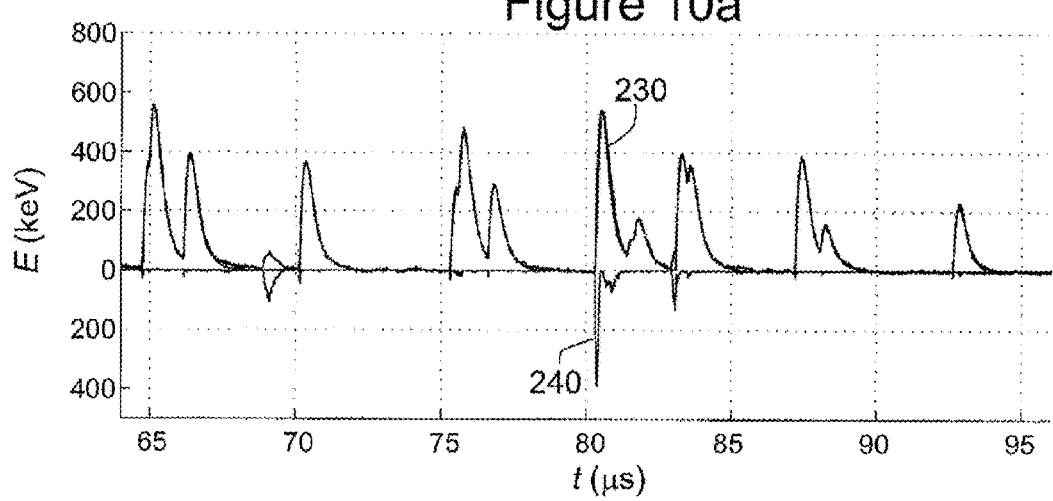
Figure 10C:
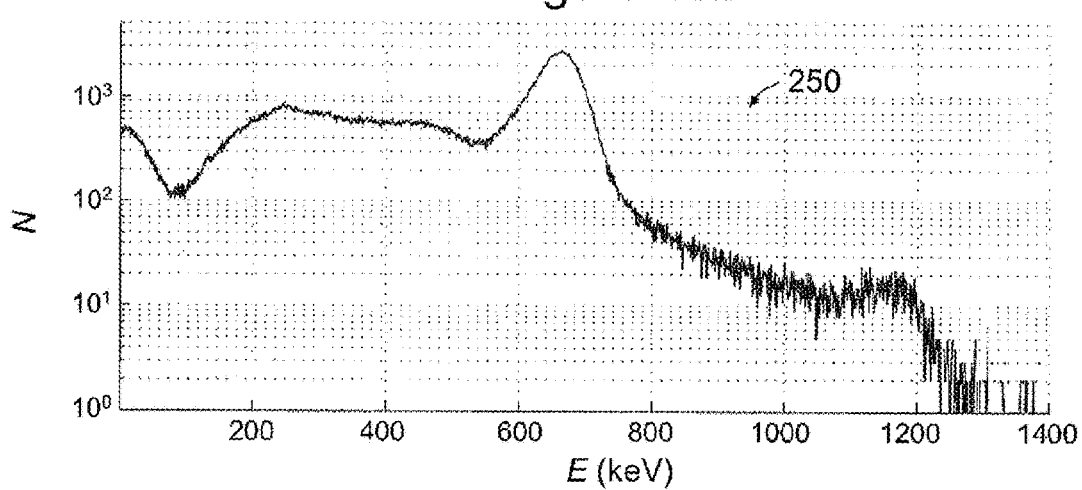

FIGS. 10a, 10b and 10c are plots of the results at various stages of processing of the digital signal processing method described above by reference to FIGS. 8 and 9, for digitized data collected with a scintillation gamma-ray detector. The detector data stream was digitized by an analog to digital converter at 125 MHz and 12 bit accuracy; the gamma-ray source used was a 137Cs source with a primary gamma-ray emission of 661.7 keV.

Scintillation detectors employ light generated by the detector/radiation interaction to detect and measure that incident radiation. A scintillation detector may comprise organic scintillators or inorganic scintillators. Organic scintillators include both organic crystalline scintillators and liquid organic solutions (where the scintillating material has been dissolved to form a liquid scintillator, which can then be plasticized to form a plastic scintillator. Inorganic scintillators include crystalline scintillators such as NaI(Tl), BGO, CsI(Tl) and many others, and photo switch detectors (in which a combination of two or more dissimilar scintillators are optically coupled to a common PMT to exploit the differing decay times of the scintillators to determine where a radiation/detection interaction has occurred).

In this example the detector comprised a 76 mm×76 mm NaI(Tl) gamma-ray scintillation detector. FIG. 10a is a plot of a portion of the digitized detector data (200) prior to processing by the signal processing method plotted as energy E(keV) versus time t(µs), together with the results (for example, at 210) of the signal processing method plotted in terms of the temporal position and energy of the component signals. For example, what may appear to be a single peak (220) in the original digitized detector data (200) at approximately 75.8 µs has been resolved into two distinct signals (222, 224) at respectively 75.3 and 75.7 µs.

From the determined temporal positions, energies and forms of the signals it is possible to generate a model of the detector data. FIG. 10b is a plot of the resulting data model (230), shown as energy E(keV) versus time t(µs), of that portion of the digitized detector data stream (200) shown in FIG. 10a. An inverted error plot (240), comprising a plot of the squares of the differences between the detector data (200) and the data model (230), is also shown, and indicates the error in the model (230). The error signal is small where the model (230) has tracked the output of the detector accurately, but the error becomes large when there are inconsistencies between the model (230) of the detector data and the detector data (200) itself. Based on this error signal (240), a decision can be made as to whether to accept or reject the signal parameters estimated by the signal processing method.

FIG. 10c is a gamma-ray energy spectrum (250), shown as a log-linear plot, produced by the signal processing method. The energy parameters that have been accepted are plotted as a histogram, where the horizontal axis represents the energy E(keV) of each signal in a respective bin, and the vertical axis represents the number of counts N of that energy determined to have been detected in the collection period (in this example, 1 s).

Figure 11:
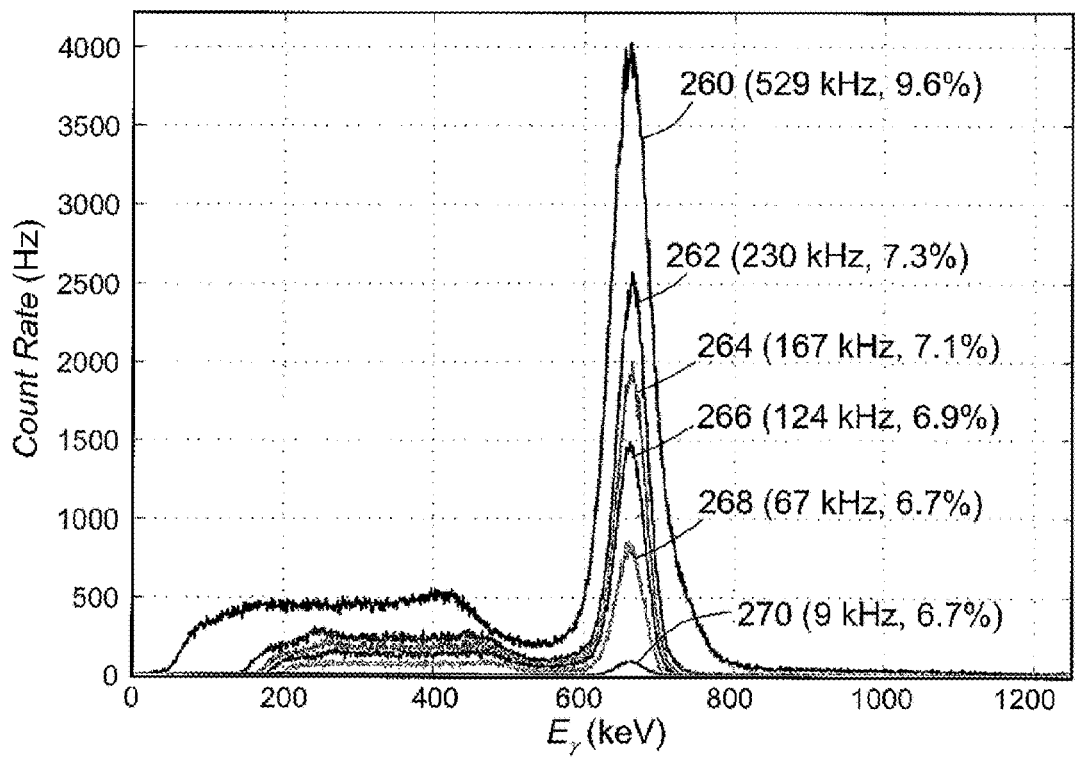
FIG. 11 are plots of gamma-ray spectra for a 137Cs source at various input count rates, processed with the method of FIG. 9.

FIG. 11 is a plot of exemplary gamma-ray energy spectra, collected using a sodium iodide NaI(Tl) gamma-ray detector. The gamma-ray energy spectra shown in FIG. 11 demonstrate the performance of the signal processing method for pulse pile-up recovery at a range of count rates. The experimental data were collected using a 76 mm×76 mm Canberra brand NaI(Tl) gamma-ray detector (model number 802) coupled to a detector base (model number 2007); no preamplifier was used. The signal processing hardware was connected to the dynode output of the detector base via a 65 MHz 14-bit analog to digital converter.

The NaI(Tl) crystal was irradiated with a collimated gamma-ray beam, which ensured that the central portion of the detector was illuminated with an essentially parallel beam of gamma-rays; the beam diameter was 50 mm.

Two 137Cs gamma-ray sources of 0.37 GBq and 3.7 GBq, in combination with three calibrated aluminium transmission filters, were used to obtain a range of gamma-ray fluxes at the detector face. The detector to source distance remained constant during data collection.

Referring to FIG. 11, the spectra (260), (262), (264), (266), (268) and (270) were collected at count rates of respectively 529 kHz, 230 kHz, 167 kHz, 124 kHz, 67 kHz and 9 kHz. As would be expected, the energy resolution of the data collected with the apparatus and processed with the method of this embodiment deteriorated as the count rate increased. Expressed as a percentage of the peak energy (i.e. 661.7 keV), the full width at half maximum (FWHM) of the peak was found to be, respectively, 9.6% 7.3%, 7.1%, 6.9%, 6.7% and 6.7%. For count rates of 9 kHz to 230 kHz, the energy resolution of the 137Cs gamma-ray energy peak at 661.7 keV remained less than 7.5%; that is, despite more than a 25 fold increase in the count rate from the NaI(Tl) detector, the energy resolution at 661.7 keV decreased by less than 0.5%.

Figure 12:
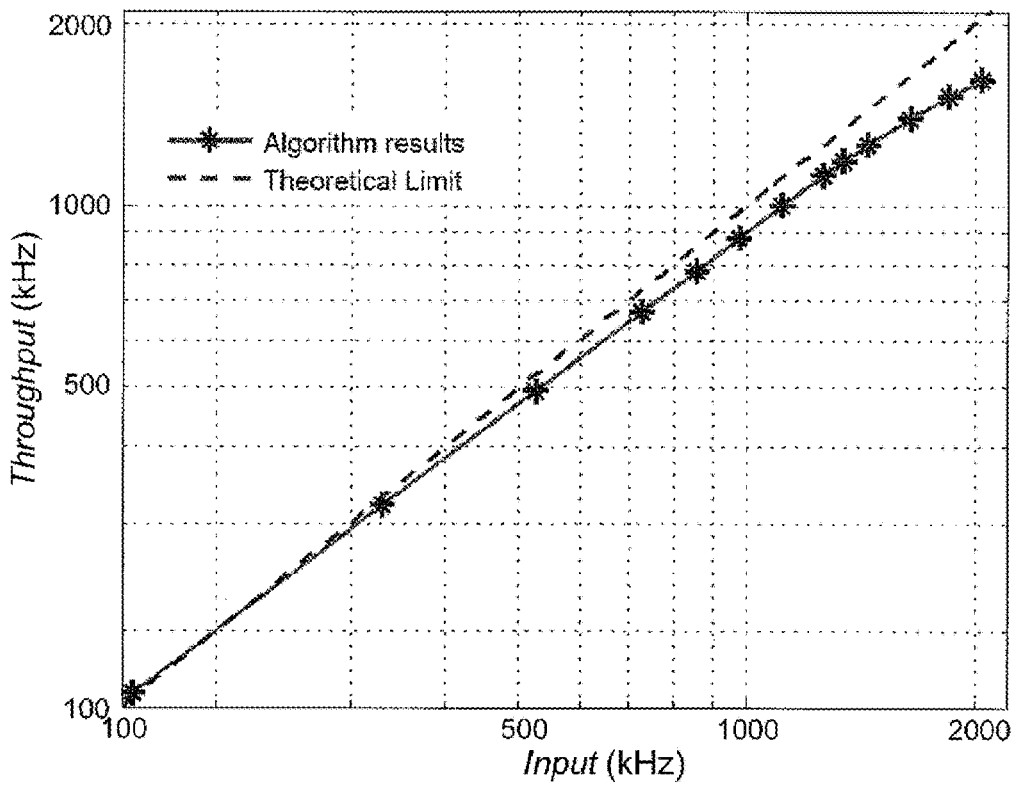
FIG. 12 is a plot of the results of a computer simulation of the signal processing method of FIG. 9 prepared using a simulated data set produced by a digital nuclear pulse generator.
Figure 13:
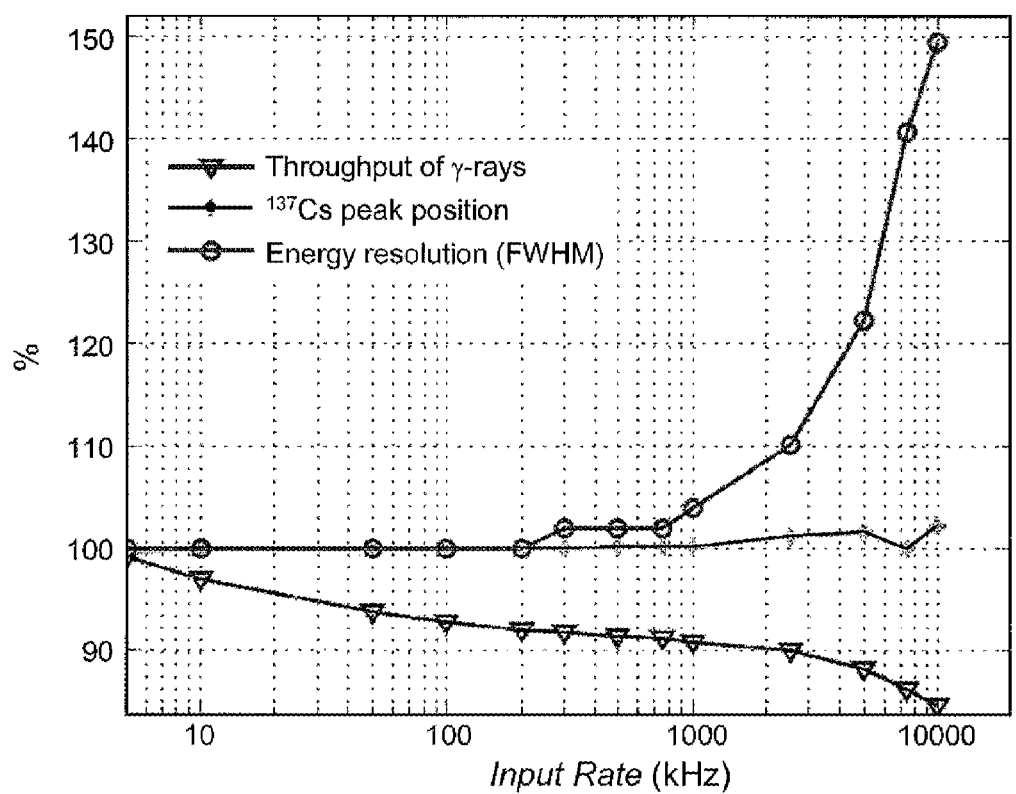
FIG. 13 is plot of the performance of the simulation of FIG. 12 for a gamma-ray source over a range of count rates.

The performance of the signal processing method of this embodiment is also illustrated in FIG. 12 and FIG. 13. These two figures were generated from the results of a computer simulation, in which the input count rate could be accurately controlled hence enabling a very wide range of input count rates to be considered. FIG. 12 is a log-log plot of the throughput of the signal processing method (i.e. that portion of the input count rate accurately detected) against input count rate from 0.1-2.5 MHz. The theoretical limit (i.e. where the throughput equals the input) is shown with a dashed line. This figure demonstrates that, over a very wide range of input count rates, the throughput of the signal processing method remains greater than or equal to 90%.

FIG. 13 is a linear-log plot comparable to FIG. 12 but with percentage throughput plotted against input count rate from 0.005-10 MHz. In addition, FIG. 13 includes plots of the energy resolution and peak position performance of the signal processing method of this embodiment. The energy resolution of the 137Cs peak degrades by less than 10% over 0-2.5 MHZ, and the peak position shows very little change over that range.

FIGS. 14a, 14b, 14c and 14d also depict the results of applying the signal processing method for pulse pile-up recovery of this embodiment to the output of a 76 mm×76 mm NaI(Tl) gamma-ray detector. Approximately 14 µs of data was used to generate the data plotted in these figures. The figures are plots of energy E in arbitrary units against time t(µs).

Figure 14A:
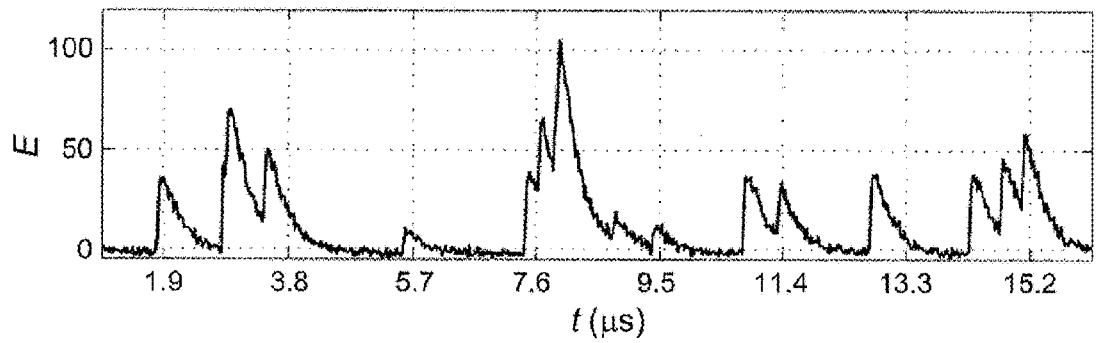
FIGS. 14a, 14b, 14c and 14d depict the results of applying the signal processing method of FIG. 9 to the output of a 76 mm×76 mm NaI(Tl) gamma-ray detector.
Figure 14B:
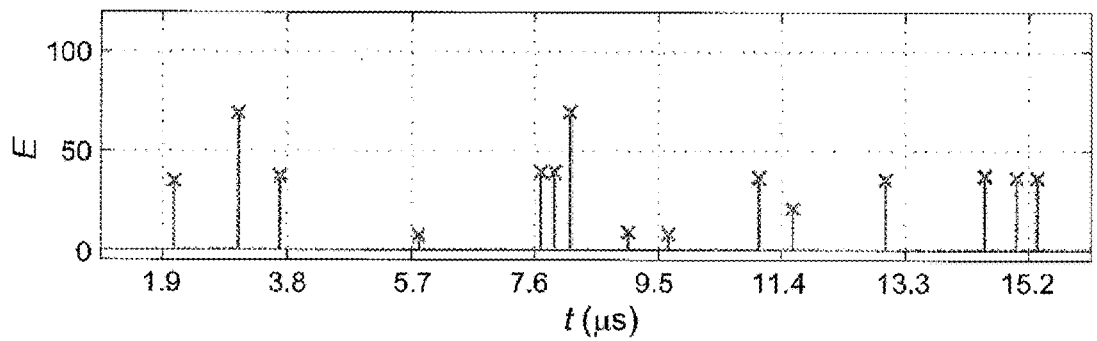
Figure 14C:
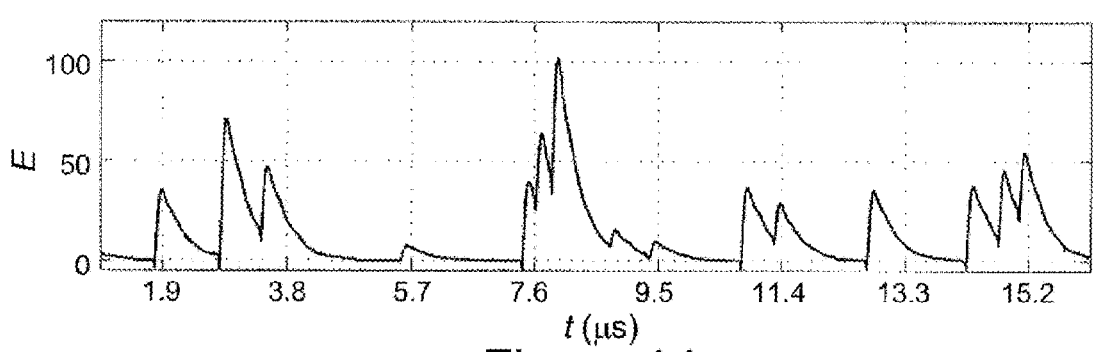
Figure 14D:
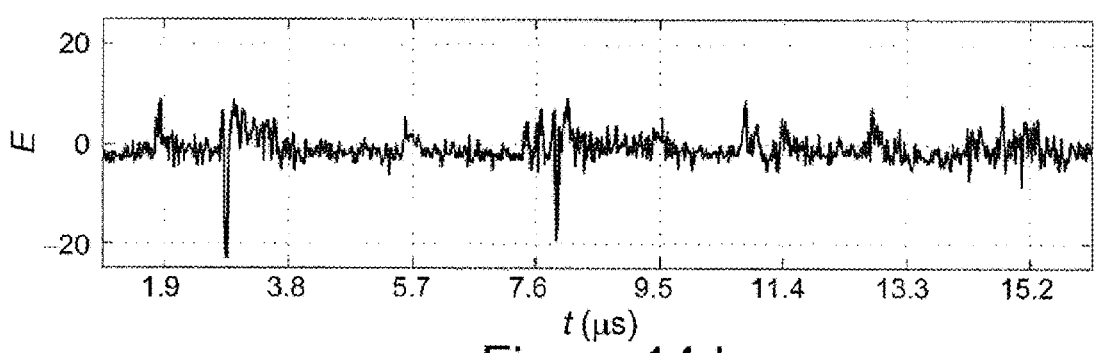

FIG. 14a is a plot of the output of the AFE (94): an analog to digital conversion rate of 65 MHz and 14 bit resolution was used to covert the time varying voltage output of the detector to digital data. FIG. 14b is a plot of the results of applying the method. The temporal positions of the signals (depicted as vertical lines) have been resolved, as have the energies of the component signal (depicted as crosses). The temporal position and the energy of the component signal were used as described above, in conjunction with the signal form, to determine a model of the gamma-ray detector output: the resulting model is plotted in FIG. 14c.

The digitized output of the gamma-ray detector was compared with the model of the gamma-ray detector output to derive an estimate of the error made in characterizing the gamma-ray detector output. This error signal is plotted in FIG. 14d. It is then possible, on the basis of this error signal, to determine thresholds for the exclusion of signal parameter estimates, such as the decision to accept or reject an estimate of signal energy may be determined by the magnitude or the error near the position of a signal peak.

FIGS. 15a, 15b, 15c and 15d depict the results of applying the signal processing method for pulse pile-up recovery of this embodiment to data collected with a semiconductor (or solid state) detector. Such detectors employ the interaction of incident radiation with the electrons in the crystalline lattice of the semiconductor, forming electron hole pairs. Examples of these detectors include High-Purity Germanium (HPGe) detectors, Silicon Diode detectors, semiconductor drift detectors (such as Silicon Drift detectors), Cadmium Telluride (CdTe) detectors and CZT detectors.

Figure 15A:
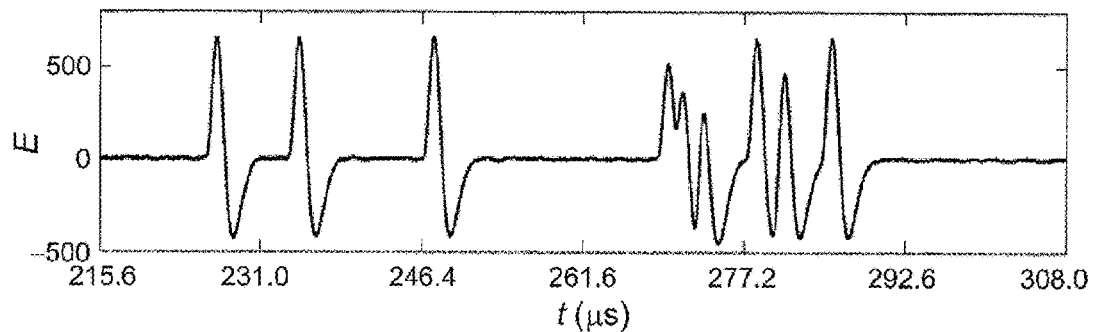
FIGS. 15a, 15b, 15c and 15d depict the results of applying the signal processing method of FIG. 9 to data collected with a HPGe detector.
Figure 15B:
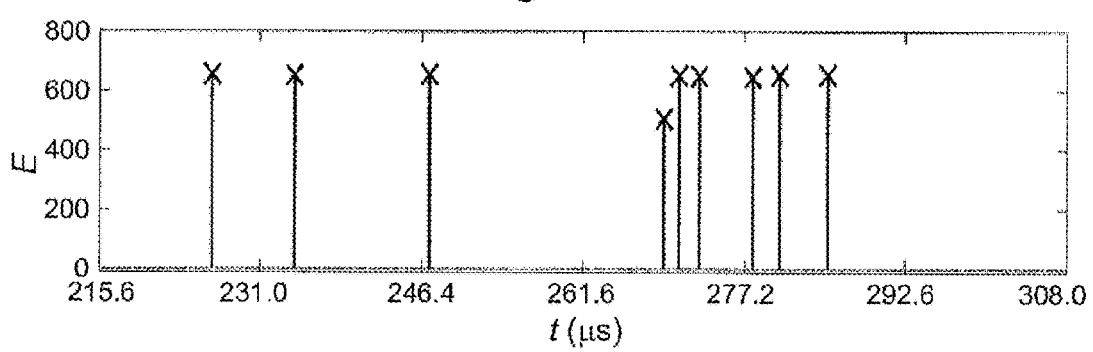
Figure 15C:
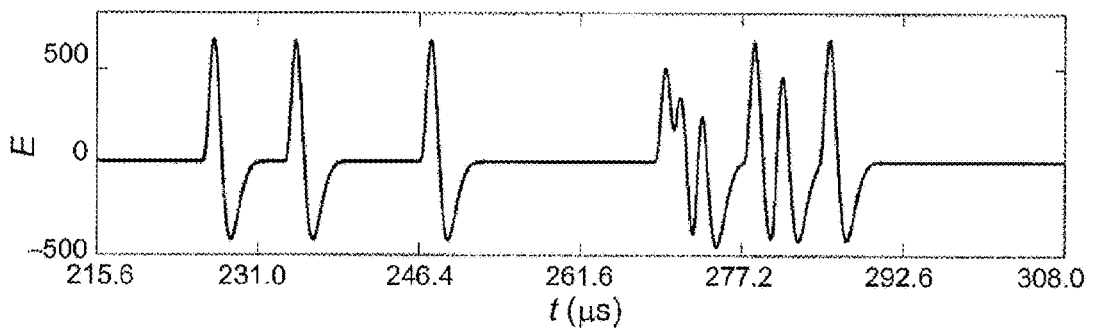

Hence, the apparatus of FIG. 1 was employed, though with a detector unit in the form of a Canberra Industries brand High Purity Germanium (HPGe) detector substituted for detector unit (14), and with a 57Co gamma-ray source (whose two principal gamma-rays have energies of 122.1 and 136.5 keV) rather than a neutron source and specimen. The output of the HPGe detector was fed through a preamplifier and then into an Ortec brand pulse shaping amplifier. Approximately 92 µs of data was collected, from which was generated the data plotted in FIGS. 15a, 15b, 15c and 15d as energy E in arbitrary units against time t(µs). FIG. 15a is a plot of the output of the AFE (94). The time varying voltage output of the detector was converted to digital data at an analog to digital conversion rate of 65 MHz with 14 bit resolution. FIG. 15b is a plot of the results of applying the method. The temporal positions of the signals (depicted as vertical lines) have been resolved, as have the energies of the component signal (depicted as crosses). The temporal position, the energy of the component signal and the signal form were used to determine a model of the processed HPGe detector output, which is plotted in FIG. 15c.

Figure 15D:
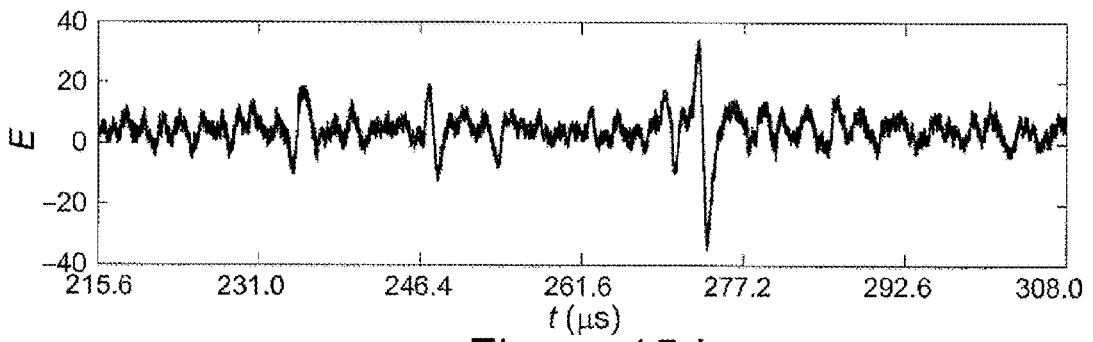

FIG. 15d is a plot of the error signal, derived from a comparison of the digitized processed output of the HPGe detector and the model of that output. This error signal can again be used to determine thresholds for the exclusion of signal parameter estimates.

FIGS. 16a, 16b, 16c and 16d depict the results of applying the signal processing method for pulse pileup recovery of this embodiment to the output of a gas proportional detector used for detecting X-rays. Gas proportional detectors are a class of detector whose behavior is similar to that of solid state detectors. Gas proportional detectors rely on the interaction of the radiation with a gas in a chamber. An electric field is created in the chamber between an axial wire and the walls of the chamber. Radiation passing through the gas ionizes the gas, which produces electrons that then collect on the wire owing to the electric field, and are output as the detector data.

Thus, the apparatus of FIG. 1 was employed, though with a detector unit in the form of a Xenon gas proportional detector substituted for the detector unit (14), and with an X-ray generator from an X-ray diffraction apparatus rather than a neutron source and specimen. Approximately 300 µs of data was used to generate the data plotted in FIGS. 16a, 16b, 16c and 16d, which plot energy E in arbitrary units against time t(µs). A significantly longer data collection period was used compared with that of the previous examples, owing to the relatively long decay time of the xenon gas proportional detector (of the order of 50 µs or more). For this reason also the sampling rate of the AFE (94) was reduced.

Figure 16A:
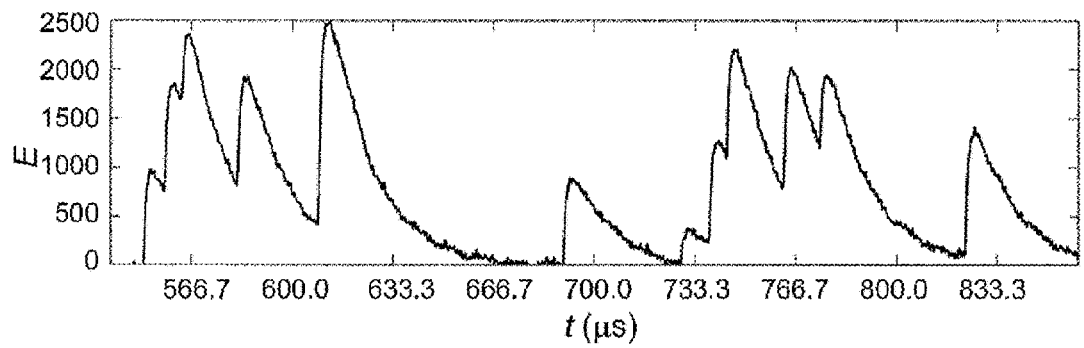
FIGS. 16a, 16b, 16c and 16d depict the results of applying the signal processing method of FIG. 9 to the output of a Xenon gas proportional detector.
Figure 16B:
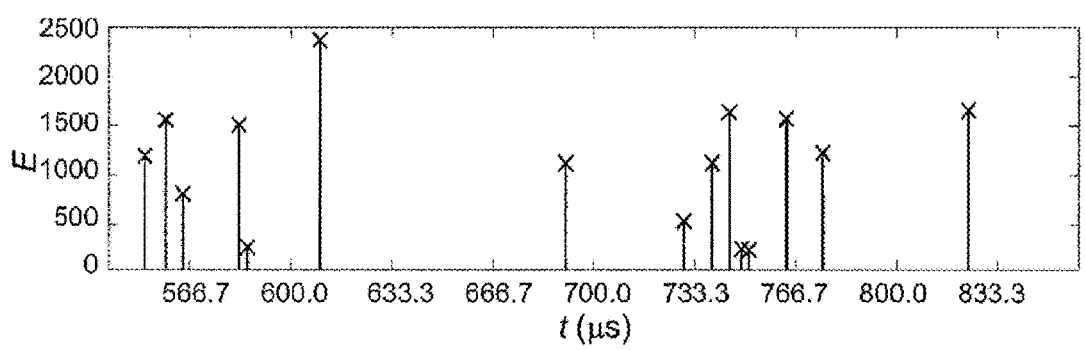
Figure 16C:
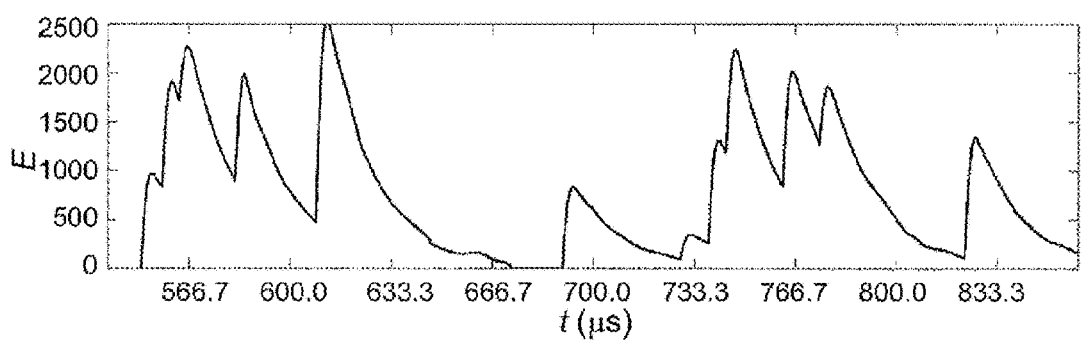
Figure 16D:
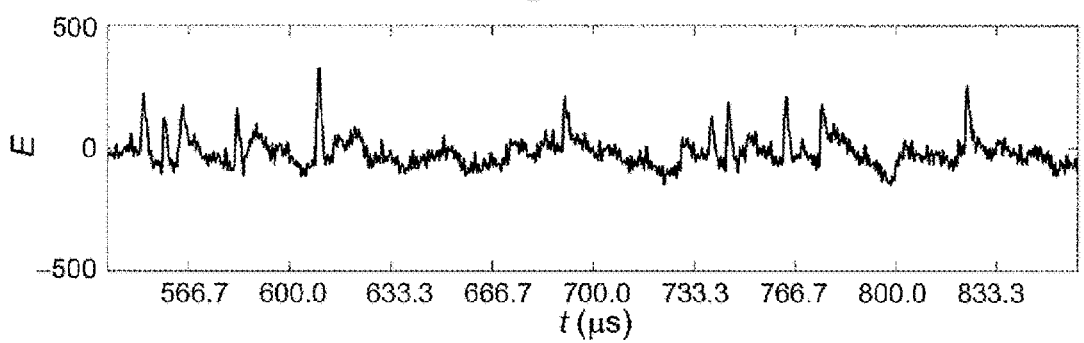

FIG. 16a is a plot of the output of the AFE (94); in this example an analog to digital conversion rate of 15 MHz and 14 bit resolution was used to covert the time varying voltage output of the detector to digital data. FIG. 16b is a plot of the results of applying the method. The temporal positions of the X-ray signals (depicted as vertical lines) have been resolved, as have the energies of the component signal (depicted as crosses). The temporal position and the energy of the component signal were used as described above, in conjunction with the signal form, to determine a model of the Xenon gas proportional detector output: the resulting model is plotted in FIG. 16c.

The digitized output of the Xenon gas proportional detector was compared with the model of the Xenon gas proportional detector output to derive an estimate of the error made in characterizing the Xenon gas proportional detector output. This error signal is plotted in FIG. 16d. This error signal can then be used to determine thresholds for the exclusion of signal parameter estimates, such as the decision to accept or reject an estimate of signal energy may be determined by the magnitude or the error near the position of a signal peak.

Plural Signal Forms

For some detector types, such as large volume solid state detectors, the form of a given signal may be one of a plurality of possible signal forms. This may be intrinsic to the detector type, or be due to temperature or other measurement-specific factors.

For example, a CsI(Tl) detector is a scintillation detector that, depending on whether a neutron or gamma-ray is being detected, exhibits two distinct signal forms. Solid state radiation detectors can exhibit a time-varying signal form, even when detecting only one form of radiation; large volume High Purity Germanium (HPGe) detectors, for example, can produce an output signal whose form depends on the specific site of interaction between the radiation and the detector. The interaction of radiation with the Germanium crystal of a HPGe detector produces a multitude of electron-hole pairs; radiation induced charge is carried by both the electrons and the holes. However, the electrons and holes travel through the HPGe detector at different velocities, so the charge pulse produced by the electrons generally has a different form from that produced by the holes. Thus, the pulse produced by the detector (being the sum of the charges carried by both the electrons and holes) has a form dependent on the location of interaction.

Hence, the plurality of signal forms are the result of these varied physical mechanisms. The respective signal forms may be denoted d1[n], d2[n], ..., dQ[n], where Q is the total number of different signal forms that may be generated by a particular detector type. Each of the possible signal forms is characterized in the same way that the signal form of data having a single signal form is characterized. With plural signal forms, however, the calibration process must be extended for an appropriate length of time to ensure that all of the possible signal forms have been identified and characterized; the estimation of signal parameters, including temporal position and signal energy, can be performed once the form of each signal in the data stream has been identified. In order to estimate these signal parameters correctly, a number of possible extensions of the method described above (for data with a single signal form) may be employed.

1. The signal parameters, including signal temporal position and signal energy, may be estimated for each signal in the data stream by treating all signals in the data stream as having the same form, such as of the first signal, viz. d1[n]. The parameters for those signals that do not acceptably conform to signal form d1[n] are rejected at the validation phase; signals for which the parameters have been estimated successfully and thus acceptably conform to signal form d1[n] are subtracted from the data stream. This process is repeated successively for d2[n] up to dQ[n], where at each stage signal parameters are estimated for signals that are of the signal form used at that stage. At each stage matrix Equation 4 is solved with matrix A constructed repeatedly using, in iteration p, the signal form dp[n]. At the conclusion of the process, those signals that have not passed the validation phase for any of the plurality of signal forms are rejected as not acceptably conforming to any of the plurality of signal forms.

2. In a variation of the first approach, the signal parameters are estimated for each of the signal forms in turn, but the signal estimates are not subtracted at each stage. Instead, the estimated signals are used in a final signal validation stage to determine the signal form and signal parameters that provide the best overall estimate of the data stream. This allows for the possibility that a signal is incorrectly estimated to be of one form, when it is actually of a form that has not yet been used to estimate the signal parameters.

3. In a further variation of the first approach, it may be possible to model each of the signal forms dp[n] as a linear combination of two signal forms, termed d1[n] and d2[n] for convenience. Hence, the pth signal form dp[n] is modeled as:

$$d_p[n] = (a \cdot d_1[n] + b \cdot d_2[n]) \quad (8)$$

where a and b are unknown constants that can be determined directly from this equation if necessary. In order to solve the matrix equation in this case, the matrix equation is extended to be:

$$x = [A_1 \vdots A_2] \begin{bmatrix} \gamma \\ \ldots \\ \beta \end{bmatrix} + \omega, \quad (9)$$

where the sub-matrices $A_1$ and $A_2$ are formed from the signal forms $d_1[n]$ and $d_2[n]$ respectively using Equation 5. The vector of unknown signal energies α has been redefined as being made up of vectors γ and β, so that the energy of the actual signal form of signal i can be estimated as $\alpha_i = \gamma_i + \beta_i$. The new system of linear equations is solved using the same methods as those used to solve the earlier matrix equation, Equation 4. It should be noted that this approach eliminates the need for explicitly estimating the unknown constants a and b, and also allows for the possibility that the signal form may be from a continuum of possible signal forms that can be represented as a linear combination of the two signal forms $d_1[n]$ and $d_2[n]$.

Thus, this approach permits a practically unlimited number of signal forms to be represented.

4. In a further variation of approach 3, the procedure of decomposition of each of the plurality of signal forms into a linear combination of just two signal forms may be extended to the general case where the plurality of signal forms may be decomposed as a linear combination of an arbitrary number of signal forms. The matrix A and the signal energy vector α is augmented accordingly.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Further, any reference herein to prior art is not intended to imply that such prior art forms or formed a part of the common general knowledge.

What is claimed is:

1. A method of detecting a plurality of individual radiation particles emitted from or transmitted through a specimen and measuring and outputting an energy of each of the detected individual radiation particles, the method comprising the following steps implemented on computer based hardware incorporating a detector circuit and one or more processor circuits:
    receiving a flux of the individual radiation particles in the detector circuit;
    obtaining an impulse response function characterizing a form of a discrete non-overlapping signal pulse generated in the detector circuit from single ones of the individual radiation particles received at the detector circuit;
    generating, by the detector circuit, an output data signal comprising a plurality of signal pulses corresponding to the detected plurality of individual radiation particles, at least two of the plurality of signal pulses temporally overlapping;
    determining a filter based on the impulse response function, the filter adapted to detect the form of the discrete non-overlapping signal pulse;
    digitizing, by the one or more processor circuits, the detector circuit output data signal to form a digital time series indicative of the plurality of signal pulses;
    identifying individual signals representing corresponding detected individual radiation particles in the digital time series by: i) filtering the digital time series with the filter to form a filtered digital time series and ii) detecting a plurality of peaks in the filtered digital time series, each peak representing a corresponding detected individual radiation particle;
    making parameter estimates of one or more parameters of the individual signals, wherein the one or more parameters comprise a signal temporal position of each of the peaks;
    forming a mathematical model of the digital time series as an accumulation of modelled individual signals, each of the modelled individual signals determined based on the impulse response function positioned at each of the signal temporal positions and an amplitude of each of the individual signals;
    determining the amplitude of the individual signals based on matching said mathematical model with the digital time series; and
    outputting the determined amplitude of each of the at least one of the individual signals, the determined amplitude being the measured energy of substantially each of the corresponding detected individual radiation particles.

2. The method of claim 1, wherein the filer comprises an inverse filter or a matched filter.

3. The method of claim 1, wherein obtaining the impulse response function comprises deriving the impulse response function based on at least one individual signal present in the detector output data.

4. The method of claim 1, further comprising determining energy of the at least one of the individual signals based on at least the impulse response function and the parameter estimates.

5. The method of claim 1, further comprising:
    determining an error corresponding to each of the parameter estimates based on a discrepancy between the digital time series and the mathematical model;
    comparing the errors to a predetermined threshold; and
    rejecting one of the parameter estimates in response to the corresponding error being greater than the predetermined threshold.

6. The method as recited in claim 1, wherein obtaining the impulse response function comprises determining the impulse response function by measuring a response of the detector circuit to one or more detections.

7. The method as recited in claim 6, further comprising interpolating the detector output data with a function to generate an expected impulse response function, and wherein the function comprises a polynomial, exponential or spline function.

8. The method as recited in claim 1, wherein the plurality of signal pulses comprise a plurality of gamma-rays or X-rays received in the detector circuit to produce the plurality of individual signals.

9. The method as recited in claim 1, wherein the plurality of signal pulses are associated with a signal pulse source comprising at least one of a metal, a landmine, a medical image, a mineral, an oil well, an unexploded ordnance, cargo, or an X-ray.

10. An apparatus for detecting a plurality of individual radiation particles emitted from or transmitted through a specimen and measuring and outputting an energy of each of the detected individual radiation particles, the apparatus comprising:
    a detector circuit configured to receive a flux of the individual radiation particles;
    a memory circuit configured to store an impulse response function; and
    a processor circuit configured to:
        obtain the impulse response function characterizing a form of a discrete non-overlapping signal pulse generated in the detector circuit from single ones of the individual radiation particles received at the detector circuit;
        receive, from the detector circuit, an output data signal comprising a plurality of signal pulses based on the received flux of the detected individual radiation particles, at least two of the plurality of signal pulses temporally overlapping;

determine a filter based on the impulse response function, the filter adapted to detect the form of the discrete non-overlapping signal pulse;

digitize the detector circuit output data to form a digital time series;

identify individual signals representing corresponding detected individual radiation particles in the digital time series by: i) filtering the digital time series with the filter to form a filtered digital time series and ii) detecting a plurality of peaks in the filtered digital time series, each peak representing a corresponding detected individual radiation particles;

make parameter estimates of one or more parameters of the individual signals, wherein the one or more parameters comprise a signal temporal position of each of the peaks;

form a mathematical model of the digital time series as an accumulation of modelled individual signals, each of the modelled individual signals determined based on the impulse response function positioned at each of the signal temporal positions and an amplitude of each of the individual signals;

determine the amplitude of each of the individual signals based on matching said mathematical model with the digital time series; and output the determined amplitude of each of the at least one of the individual signals, the determined amplitude being the measured substantially energy of each of the corresponding detected individual radiation particles.

11. The apparatus of claim 10, wherein the processor is further configured to:
define the filer as an inverse filter or a matched filter; and
make the parameter estimates by estimating a plurality of time of arrival parameters of the individual signals based on filtering the digital time series with the filter.

12. The apparatus of claim 10, wherein the processor is configured to obtain the impulse response function by deriving the impulse response function based on at least one individual signal present in the detector output data signal.

13. The apparatus of claim 10, wherein the processor is configured to determine the energy of the at least one of the individual signals based on at least the impulse response function and the parameter estimates.

14. The apparatus of claim 10, wherein the processor is configured to:
determine an error corresponding to each of the parameter estimates based on a discrepancy between the digital time series and the mathematical model;
compare the errors to a predetermined threshold; and
reject one of the parameter estimates in response to the corresponding error being greater than the predetermined threshold.

15. The apparatus of claim 10, wherein the processor is configured to obtain the impulse response function by measuring a response of the detector to one or more detections.

16. The apparatus of claim 15, wherein the processor is configured to interpolate the detector output data signal with a function to generate an expected impulse response function, and wherein the function comprises a polynomial, exponential or spline function.

17. The apparatus of claim 10, wherein the plurality of signal pulses comprise a plurality of gamma-rays or X-rays arriving at the detector to produce the plurality of individual signals.

18. The apparatus of claim 10, wherein the plurality of signal pulses are associated with a signal pulse source comprising at least one of a metal, a landmine, a medical image, a mineral, an oil well, an unexploded ordnance, cargo, or an X-ray.

19. A non-transitory computer readable medium containing computer instructions stored therein to detect a plurality of individual radiation particles emitted from or transmitted through a specimen and measure and output an energy of each of the detected individual radiation particles by causing a computer processor circuit to:

obtain an impulse response function characterizing a form of a discrete non-overlapping signal pulse generated in a detector circuit from single ones of the individual radiation particles received at the detector circuit;

receive, from the detector circuit, an output data signal comprising a plurality of signal pulses based on radiation flux of the detected individual radiation particles at the detector circuit, at least two of the plurality of signal pulses temporally overlapping;

determine a filter based on the impulse response function, the filter adapted to detect the form of the discrete non-overlapping signal pulse;

digitize the detector circuit output data particles to form a digital time series;

identify individual signals representing corresponding detected individual radiation particles in the digital time series by: i) filtering the digital time series with the filter to form a filtered digital time series and ii) detecting a number of peaks in the filtered digital time series, each peak representing a corresponding detected individual radiation particles;

make parameter estimates of one or more parameters of the individual signals, wherein the one or more parameters comprise a signal temporal position of each of the peaks;

form a mathematical model of the digital time series as an accumulation of modelled individual signals, each of the modelled individual signals determined based on the impulse response function positioned at each of the signal temporal positions and an amplitude of each of the individual signals;

determine the amplitude of each of the individual signals based on matching said mathematical model with the digital time series; and output the determined amplitude of each of the at least one of the individual signals, the determined amplitude being the measured energy of substantially each of the corresponding detected individual radiation particles.

20. The non-transitory computer readable medium of claim 19, wherein obtaining the impulse response function comprises determining the impulse response function by measuring a response of the detector to one or more detections.

21. An apparatus for detecting a plurality of individual radiation particles emitted from or transmitted through a specimen and measuring and outputting an energy of each of the detected individual radiation particles, the apparatus comprising:

means for receiving a flux of the individual radiation particles;

means for obtaining an impulse response function characterizing a form of a discrete non-overlapping signal pulse generated in the means for receiving the flux of the individual radiation particles from single ones of the individual radiation received at the means for receiving the flux of the individual radiation;

means for generating an output data signal comprising a plurality of signal pulses based on the received flux of the detected individual radiation particles, at least two of the plurality of signal pulses temporally overlapping;

means for determining a filter based on the impulse response function, the filter adapted to detect the form of the discrete non-overlapping signal pulse;

means for digitizing the output data signal to form a digital time series;

means for identifying individual signals representing corresponding detected individual radiation particles in the digital time series by: i) filtering the digital time series with the filter to form a filtered digital time series and ii) detecting a number of peaks in the filtered digital time series, each peak representing a corresponding detected individual radiation particles;

means for making parameter estimates of one or more parameters of the individual signals, wherein the one or more parameters comprise a signal temporal positions of each of the peaks;

means for forming a mathematical model of the digital time series as an accumulation of modelled individual signals, each of the modelled individual signals determined based on the impulse response function positioned at each of the signal temporal positions and an amplitude of each of the individual signals;

means for determining the amplitude of each of the individual signals based on matching said mathematical model with the digital time series; and means for outputting the determined amplitude of each of the at least one of the individual signals, the determined amplitude being the measured energy of substantially each of the corresponding detected individual radiation particles.

22. The apparatus of claim 21, wherein the means for obtaining the impulse response function comprises means for determining the impulse response function by measuring a response of the means for receiving the flux of the individual radiation particles to one or more detections.

* * * * *